US010999817B2

(12) United States Patent
Tugnawat et al.

(10) Patent No.: US 10,999,817 B2
(45) Date of Patent: May 4, 2021

(54) SYSTEMS AND METHODS FOR DELIVERING ALERTS TO AUTONOMOUS USER EQUIPMENT (UE)

(71) Applicant: QUALCOMM INCORPORATED, San Diego, CA (US)

(72) Inventors: Yogesh Tugnawat, San Diego, CA (US); Zaman Riyaz, San Diego, CA (US); Yogesh Mahajan, San Diego, CA (US); Deepak Ganapathy Appachu Muckatira, San Diego, CA (US); Balaji Vaidyanathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/882,864

(22) Filed: Jan. 29, 2018

(65) Prior Publication Data

US 2019/0239186 A1    Aug. 1, 2019

(51) Int. Cl.
| *H04W 4/00* | (2018.01) |
| *H04W 72/04* | (2009.01) |
| *H04W 68/02* | (2009.01) |
| *H04L 29/08* | (2006.01) |
| *H04W 88/06* | (2009.01) |
| *H04W 4/46* | (2018.01) |
| *H04W 4/80* | (2018.01) |

(52) U.S. Cl.
CPC .......... *H04W 68/02* (2013.01); *H04L 67/12* (2013.01); *H04W 88/06* (2013.01); *H04W 4/46* (2018.02); *H04W 4/80* (2018.02)

(58) Field of Classification Search
CPC ........ H04L 2209/84; H04L 2001/0097; G08G 1/096791; G08G 1/096741; G08G 1/0962; G08G 1/09623; G08G 1/096708; G08G 1/096716; G08G 1/096725; G08G 1/017; G08G 1/0965; G08G 1/163; G08G 1/167
See application file for complete search history.

(56) References Cited

U.S. PATENT DOCUMENTS

| 9,307,509 B1* | 4/2016 | Heninwolf .......... H04W 56/005 |
| 9,736,847 B2 | 8/2017 | Feng et al. |
| 2010/0250346 A1 | 9/2010 | Bai et al. |
| 2016/0295624 A1 | 10/2016 | Novlan et al. |

(Continued)

FOREIGN PATENT DOCUMENTS

| EP | 2800442 B1 | 7/2016 |
| WO | 2016108554 A1 | 7/2016 |

(Continued)

OTHER PUBLICATIONS

International Search Report and Written Opinion—PCT/US2018/064159—ISA/EPO—Mar. 20, 2019 (175667WO).

*Primary Examiner* — Gary Lafontant
(74) *Attorney, Agent, or Firm* — Smith Tempel Blaha LLC

(57) ABSTRACT

A method for forwarding an alert includes receiving an alert in a first communication device over a first communication network, and forwarding the alert to a second communication device in a second communication network, the second communication network comprising a vehicle-to-vehicle communication network, the second communication device incapable of receiving the alert over the first communication network.

30 Claims, 13 Drawing Sheets

(56) References Cited

U.S. PATENT DOCUMENTS

| | | | |
|---|---|---|---|
| 2017/0273057 A1* | 9/2017 | Lee | H04W 72/042 |
| 2017/0289733 A1* | 10/2017 | Rajagopal | H04W 4/70 |
| 2018/0077668 A1 | 3/2018 | Chun et al. | |
| 2018/0213498 A1* | 7/2018 | Khoryaev | H04W 56/0015 |
| 2018/0220269 A1 | 8/2018 | Katakam et al. | |

FOREIGN PATENT DOCUMENTS

| | | | |
|---|---|---|---|
| WO | 2016108555 A1 | 7/2016 |
| WO | 2016144147 A1 | 9/2016 |
| WO | 2016159712 A1 | 10/2016 |

\* cited by examiner

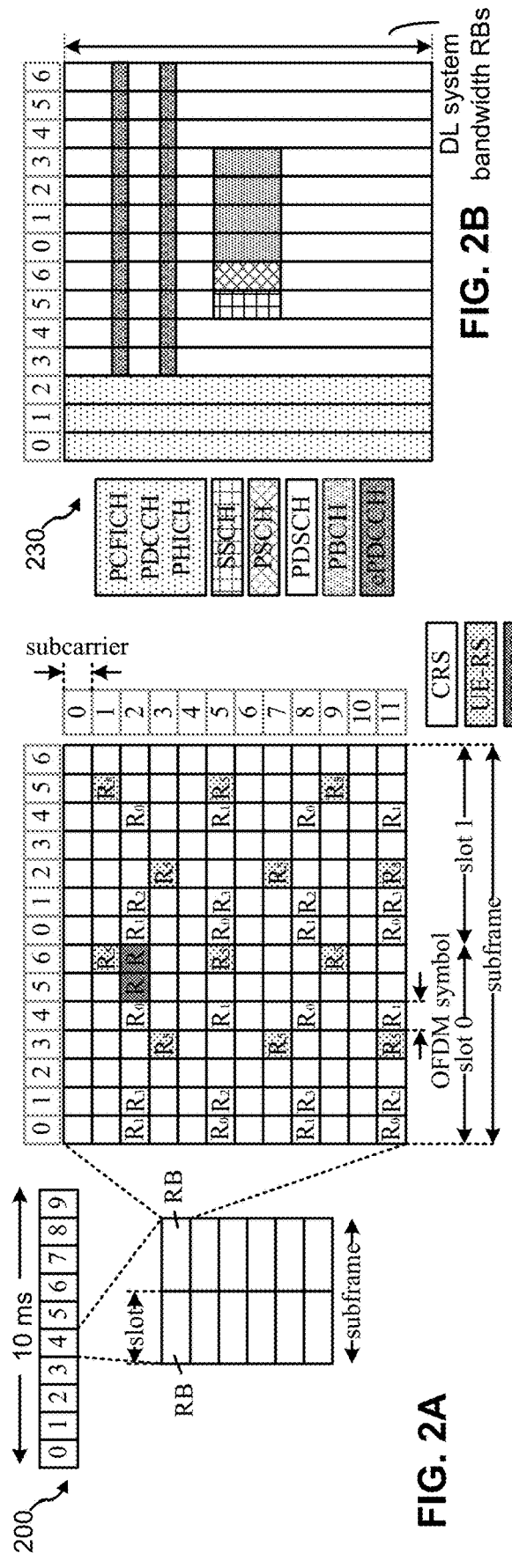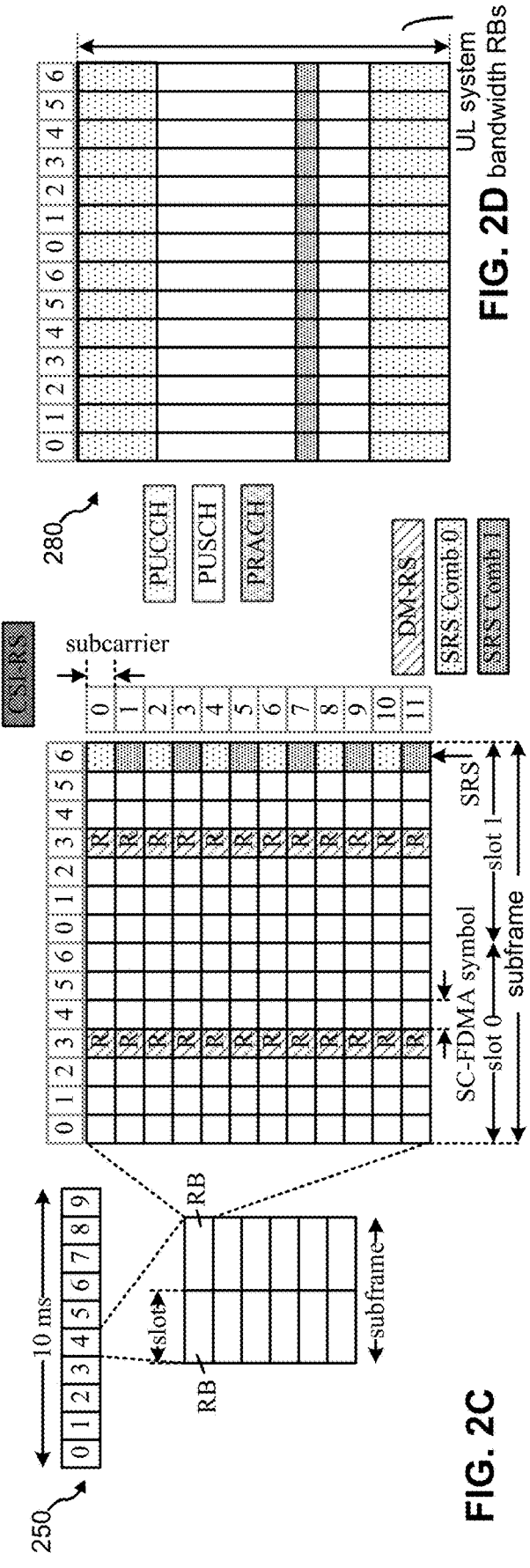

SYSTEMS AND METHODS FOR DELIVERING ALERTS TO AUTONOMOUS USER EQUIPMENT (UE)

TECHNICAL FIELD

The technology discussed below relates to wireless communication systems, and more particularly to wireless communication devices having access to licensed and unlicensed communication spectrum. Embodiments enable communication of alert messages to wireless communication devices that may be out of coverage, or that may have limited access to communication connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A variety of connectivity can be provided to a user equipment (UE). When a UE is a vehicle, such as an automobile, the UE may be coupled to a cellular-type communication network (such as an LTE network or a 5G network), may be coupled to one or more other UEs over a vehicle-to-vehicle (V2V) network (such as a PC5 interface on a sidelink communication channel), may be coupled to a roadside unit (RSU) or another vehicle-to-everything (V2X) node over one or more communication channels (such as cellular or sidelink communication channels), and may be coupled to other communication devices over, for example, a WiFi communication channel, a dedicated short range communication (DSRC) channel, a wireless wide area network (WWAN), a wireless local area network (WLAN), an integrated cellular vehicle to everything (CV2X)/LTE/5G communication channel, or another communication channel.

When a UE is capable of only V2V communication (referred to as Mode 4, or an autonomous UE), or when a UE capable of LTE or 5G communication (referred to as Mode 3) may be out-of-coverage of the LTE or 5G communication network, an emergency alert, such as a commercial mobile alert service (CMAS) communication, an earthquake tsunami warning system (ETWS) communication, or another alert message broadcast on a communication network, may not reach the Mode 4 UE or the out-of-coverage Mode 3 UE.

Therefore, it would be desirable to have the ability to forward such an alert to a UE that may not be able to otherwise receive it.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for forwarding an alert, including receiving an alert in a first communication device over a first communication network, and forwarding the alert to a second communication device in a second communication network, the second communication network comprising a vehicle-to-vehicle communication network, the second communication device incapable of receiving the alert over the first communication network.

Another aspect of the disclosure provides a system for communication including a first communication device configured to receive an alert over a first communication network, and the first communication device configured to forward the alert to a second communication device in a second communication network, the second communication network comprising a vehicle-to-vehicle communication network, the second communication device incapable of receiving the alert over the first communication network.

Yet another aspect of the disclosure provides a non-transitory computer-readable medium storing computer executable code for communication, the code executable by a processor to control a method including receiving an alert in a first communication device over a first communication network; and forwarding the alert to a second communication device in a second communication network, the second communication network comprising a vehicle-to-vehicle communication network, the second communication device incapable of receiving the alert over the first communication network.

Still another aspect of the disclosure provides a device for wireless communication including means for receiving an alert in a first communication device over a first communication network; and means for forwarding the alert to a second communication device in a second communication network, the second communication network comprising a vehicle-to-vehicle communication network, the second communication device incapable of receiving the alert over the first communication network.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
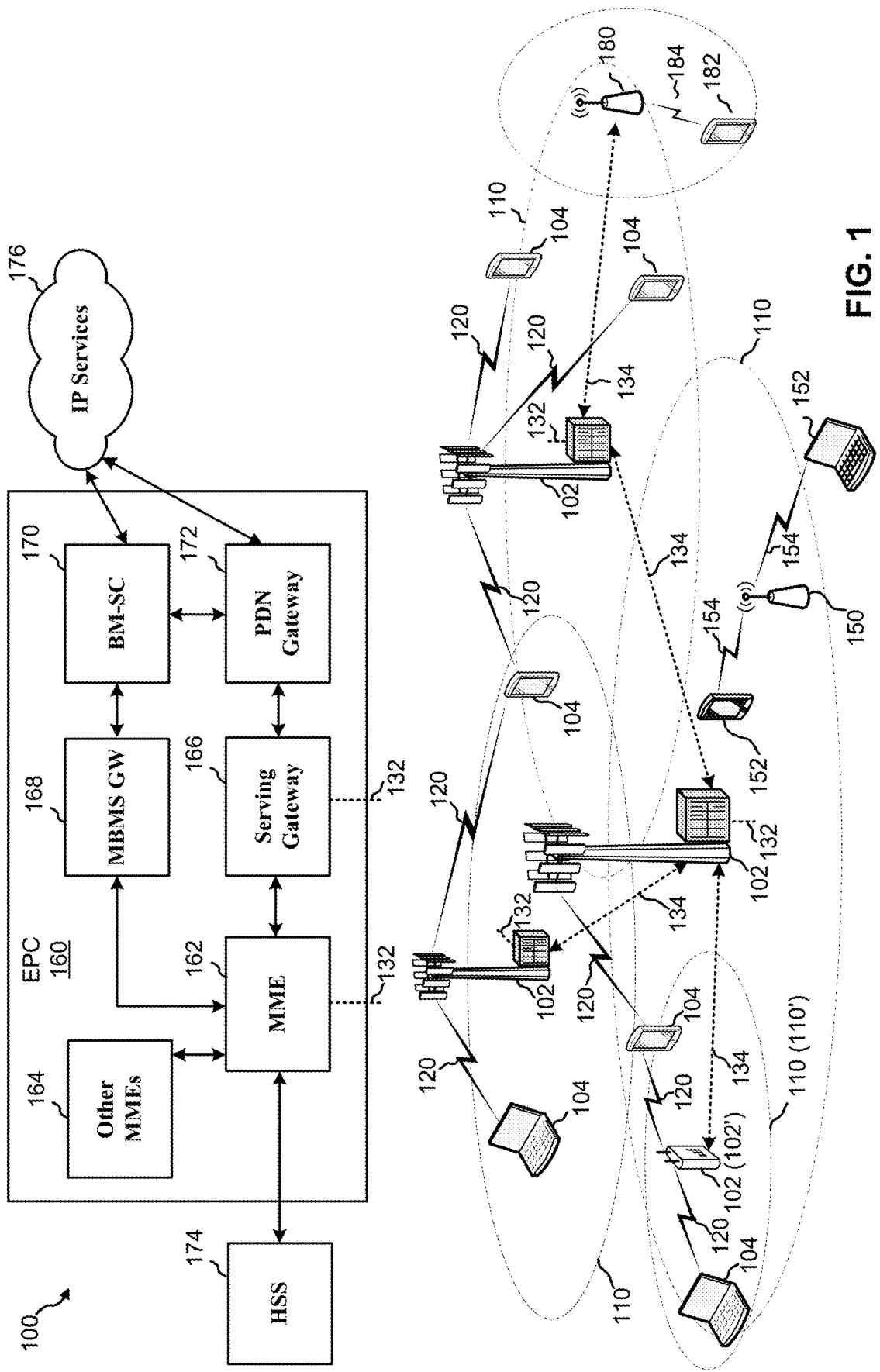
FIG. 1 is a diagram illustrating an example of a wireless communications system and an access network.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Non-transitory computer-readable media include computer-readable storage media. Computer-readable storage media may be any available media that can be accessed by a computer. By way of example, and not limitation, such computer-readable storage media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), gNode B (gNB) (i.e., for a mmW base station capable of communicating over a 5G communication network), an access point, a base transceiver station, a radio base station, a radio transceiver, a transceiver function, a basic service set (BSS), an extended service set (ESS), or some other suitable terminology. When a base station 102 is referred to as an eNB or a gNB, it is understood that the terms eNB and gNB are intended to include any of the base station designations mentioned herein. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an automobile, a drone, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
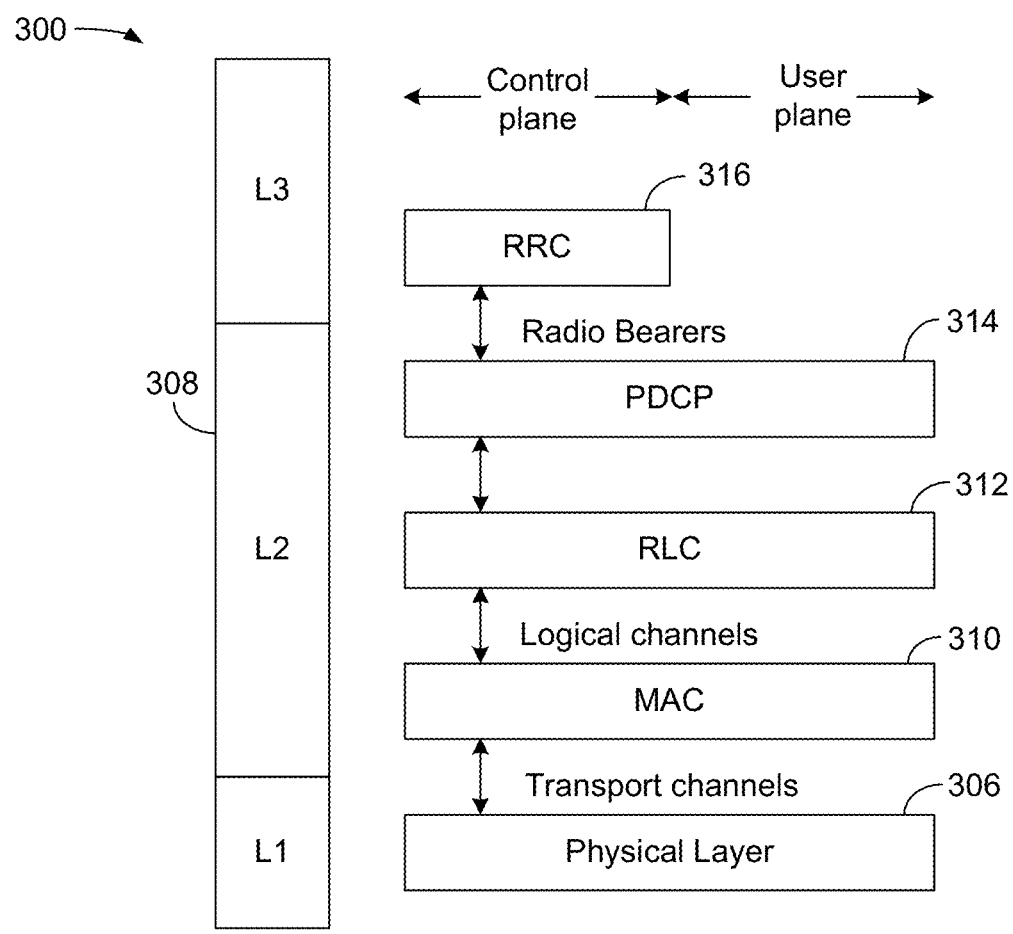
FIG. 3 is a diagram illustrating an example of a radio protocol architecture for the user and control planes in LTE in accordance with various aspects of the present disclosure.

FIG. 3 is a diagram 300 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that is terminated at the PDN gateway 172 (FIG. 1) on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (e.g., radio bearers) and for configuring the lower layers using RRC signaling between the eNB and the UE.

Figure 4:
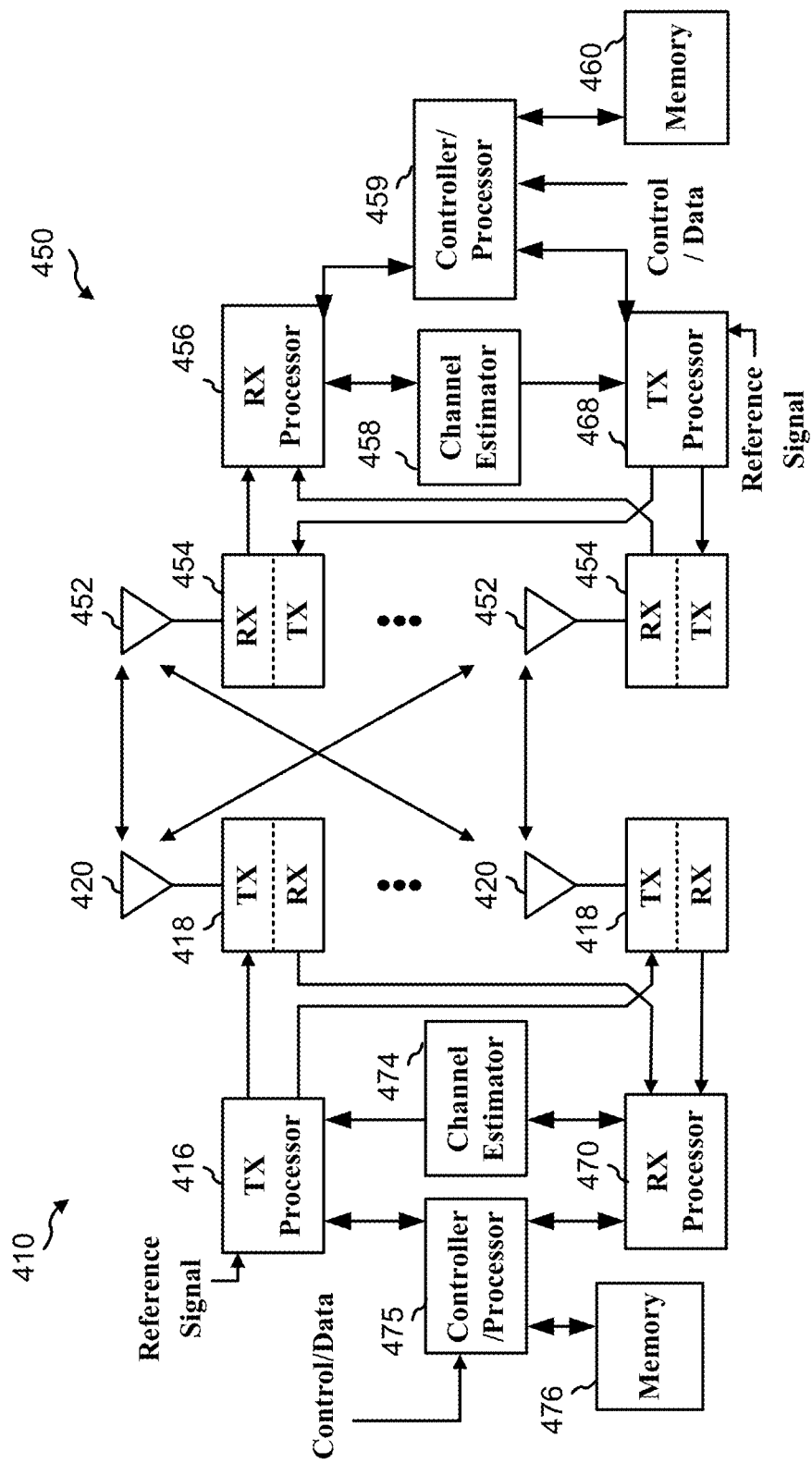
FIG. 4 is a diagram illustrating an example of an evolved Node B (eNB) and user equipment (UE) in an access network.

FIG. 4 is a block diagram of an eNB 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the eNB 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

Currently some services provided over the cellular/3GPP networks can be offloaded to WiFi networks to reduce the overload and cost of 3GPP networks. Many of the IP Multimedia Subsystem (IMS) and 3GPP services like voice over LTE (VoLTE), Video-Telephony (VT), rich communication services (RCS), short message services (SMS), Enhanced 911 (E911) may be provided over wireless local area networks (e.g., WiFi) using an ePDG. WLAN coverage, e.g., over WiFi, may also be available in areas where normal WWAN/cellular (e.g., UMTS/LTE) coverage is not available e.g. underground parking, underground subway and/or train station, sewers etc. Also, a person can carry a small battery powered WiFi dongle device anywhere where normal cellular WWAN coverage is not available. In the case of an emergency, in no coverage area a CMAS message and/or a PWS message and/or an ETWS message and/or other emergency service related message may need to be distributed to device users to notify the users of emergency conditions and/or available emergency relief services. Thus methods and apparatus for providing emergency broadcast services like the CMAS message service, PWS message service, ETWS information related service over non cellular networks, e.g., over WLANs, are highly desirable. Various features related to supporting emergency broadcast services using ePDG-IWLAN are described below.

Whenever there is no cellular/WWAN (e.g., LTE/UMTS) coverage, currently a UE may get many of the 3GPP services over IWLAN. However unfortunately many broadcast services including vital emergency broadcast services are not currently offered over WLANs, e.g., over a WiFi network. If broadcast services like CMAS, PWS, and ETWS are not offloaded to WiFi and/or other local wireless networks, in indoor and/or underground scenarios where there is no cellular WWAN coverage, the emergency related warning messages may not reach the users in such areas which is highly undesirable. Thus the desirability and need of methods and apparatus to support offloading 3GPP broadcast services to IWLANs is evident.

Various features related to implementing broadcast services e.g., CMAS, PWS, ETWS, and/or other commercial or emergency broadcast services over WiFi using ePDG-IWLAN path based on S2b interface are described. Currently many broadcast/multicast services use beacons over WiFi. An IP packet (e.g., including emergency broadcast information) with broadcast IP from an ePDG may be used by a WLAN access point (AP) to broadcast, e.g., over WiFi, to all users accessing the WLAN through the WLAN AP. When the UEs connected to ePDG (e.g., UEs that are associated with the ePDG and/or authorized to receive WWAN services) receive the broadcast IP packet using broadcast IP configured based on an ePDG assigned IP address, the UE's consider the packet for processing to recover the communicated broadcast information. Other devices which are not affiliated with the WWAN service provider and/or not getting 3GPP services using the ePDG, just simply discard the packet as the broadcast IP (e.g., configured by the ePDG) used to broadcast the IP packet is unknown to these devices and thus such devices are unable to decode the packet as it is security protected.

In some configurations if information, e.g., emergency related messages, are intended to be broadcast to non-3GPP users/subscribers in addition to 3GPP users, then such information may be broadcast without being IP secured by the ePDG and/or using a broadcast IP address of the WLAN AP broadcasting the information to the connected devices rather than the broadcast IP assigned by the ePDG.

As used herein, the term "autonomous" may refer to a UE or another communication device, which may not have a connection to a communication network over which emergency alert messages may be broadcast. For example, when a UE is capable of only V2V communication, it may be considered a "Mode 4" UE in that it may not have a connection to a communication network over which emergency alert messages may be broadcast.

As used herein, the term "Mode 3 UE" or "Mode 3 capability" refers to a UE that may be connected to a broadband network, such as an LTE, 5G, or other network, and, when connected to the broadband network, is capable of receiving an emergency alert, such as a ETWS alert or a CMAS alert from the LTE or 5G network. Such a Mode 3 UE is referred to as "in coverage" when it is connected to the LTE or 5G network. An "out-of-coverage" Mode 3 UE refers to a UE that is capable of being connected to an LTE or 5G network, but that is not connected to the LTE or 5G network at a particular time, such that it is "out-of-coverage" of the network. When a UE is an "out-of-coverage" Mode 3 UE, it is incapable of receiving an alert, such as a ETWS alert or a CMAS alert, from the broadband LTE or 5G network.

In an exemplary embodiment, an LTE V2V capable UE may be configured to forward an alert to a UE that may only have V2V capability, or that may have Mode 3 capability, but may be out-of-coverage of a communication network.

In an exemplary embodiment, a Mode 3 UE capable of supporting V2V and LTE or V2X (such as WiFi, DSRC, etc.) may be coupled to an autonomous UE (such as a Mode 4 UE or an out-of-LTE coverage Mode 3 UE) over a PC 5 interface or other sidelink channel, and may be configured to provide alerts received over an LTE, 5G, WiFi, DSRC, etc., channel, to the Mode 4 UE, or to an out-of-coverage Mode 3 UE, over the PC 5 (or other sidelink) communication channel.

Alternatively, a Mode 3 UE that may be coupled to a CV2X/LTE/5G channel, or to an RSU or other V2X node (such as a drone, or other vehicle, that may be configured to broadcast information) over a WWAN or WLAN connection, may be configured to provide the alert to a Mode 4 UE, or to an out-of-coverage Mode 3 UE, over the PC 5 (or other sidelink) interface.

Figure 5:
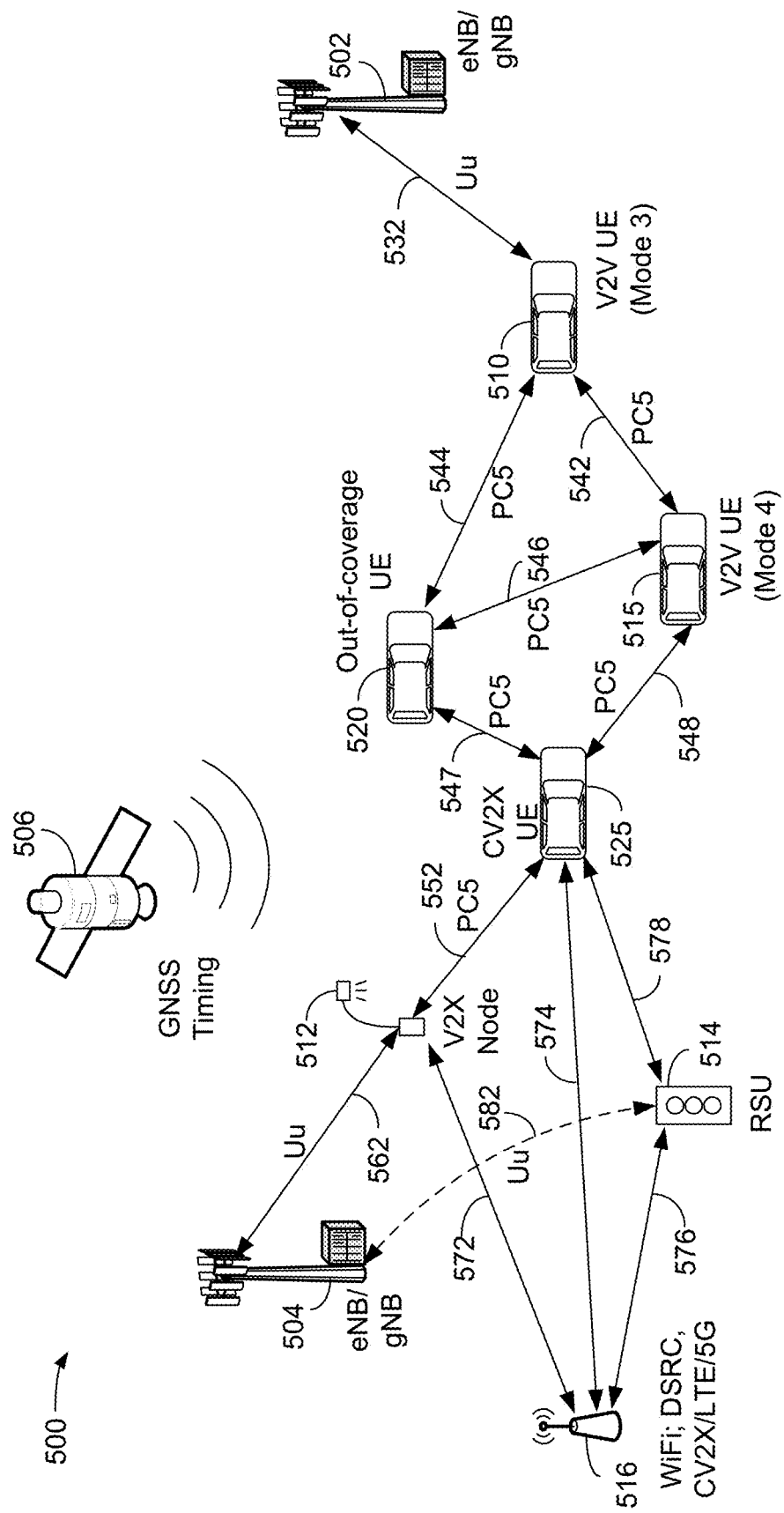
FIG. 5 shows a communication system in accordance with an exemplary embodiment of delivering an alert to an autonomous UE.

FIG. 5 shows a communication system 500 in accordance with an exemplary embodiment of delivering an alert to an autonomous UE. The system 500 includes a base station (also referred to as an eNB or a gNB) 502 and a base station 504. In an exemplary embodiment, the base stations 502 and 504 may be exemplary embodiments of the base stations 102 of FIG. 1, and may be referred to interchangeably as a base station, an eNB or a gNB.

The base station 502 may be coupled to a UE 510 over an air interface, also referred to as a Uu interface 532. In an exemplary embodiment, the UE 510 is a vehicle capable of licensed communication with the base station 502 over, for example, an LTE communication network, and may also be capable of communicating directly with one or more other UEs (or vehicles) over, for example, a sidelink communication channel, that is, not using a WAN such as an LTE or a 5G network.

The base station 504 may be coupled to a V2X node 512 over a Uu interface 562. The V2X node 512 may be a communication device configured to participate in, facilitate, or otherwise engage in direct vehicle-to-everything (V2X) communications, and, in an exemplary embodiment, may also be referred to as a roadside unit (RSU), or may also be a vehicle, such as a drone, or other vehicle that may be configured to broadcast information.

In an exemplary embodiment, the UE 510 may be referred to as a V2V UE and may be coupled in Mode 3, where the UE 510 has an LTE or a 5G connection (or other WAN connection) with the base station 502 over Uu interface 532. The UE 510 may also be operatively and communicatively coupled to UEs 515 and 520. In an exemplary embodiment, the UE 515 may be a V2V UE coupled in Mode 4, where it may be in communication with the UE 510, and other UEs 520 and 525, over, for example, a direct UE to UE interface, such as a PC 5 interface 542, 546 and 548, respectively. A PC 5 interface may also be referred to as a sidelink communication channel in that it does not require LTE, 5G, or another broadband network connectivity, but instead, allows direct V2V communication between and among UEs. The UE 520 may be referred to as an out-of-coverage UE, in that it may be out of coverage of the base station 502 and the base station 504, and therefore may not have an LTE or 5G connection with the base station 502 or the base station 504. In an exemplary embodiment, the UE 520 may be in communication with the UE 515 over PC 5 interface 546, and may be in communication with the UE 525 over PC 5 interface 547.

The UE 525 may be referred to as a cellular vehicle-to-everything (CV2X) UE in that it may be connected to a network 516 over connection 574. The network 516 may be a WiFi network, a DSRC network, a CV2X/LTE/5G network, or another network, such as an Internet Protocol (IP) network. The UE 525 may also be coupled to an RSU 514 over a connection 578. The RSU 514 and the connection 578 may represent, for example, a WWAN, a WLAN, or another network. The UE 525 may also be coupled to the V2X node 512 over a PC 5 interface 552. The V2X node 512 may also be coupled to the network 516 over a connection 572 and the RSU 514 may be coupled to the network 516 over connection 576. In an exemplary embodiment, the UEs 510, 515, 520, 525, the V2X node 512, and the RSU 514 may be exemplary embodiments of the UE 450 described in FIG. 4.

In an exemplary embodiment, an RSU may comprise a stationary infrastructure entity supporting V2X applications that can exchange messages with other entities supporting V2X applications. As used herein, the term RSU refers to a logical entity that combines, or may be configured to combine, V2X application logic with the functionality of a base station, such as an eNB or a gNB (referred to as eNB-type RSU, or gNB-type RSU if so configured) or that may be configured to combine V2X application logic with the functionality of a UE (referred to as UE-type RSU if so configured). The RSU 514 shown in FIG. 5 is intended to be a generic RSU, where the RSU 514 is shown as a stand-alone element, not connected to a base station. If connected to a base station, the RSU 514 could be connected to the base station 504 (or another base station) over a Uu connection, such as Uu connection 582, which is shown in FIG. 5 in broken line to indicate that it is optional. In an exemplary embodiment, sidelink resources for V2X communications may be preconfigured similar to the manner in which sidelink resources would be preconfigured for a Mode 4 UE. If the RSU 514 is connected to a base station (i.e., similar to V2X node 512) the sidelink resources could be configured by the base station to which the RSU 514 could be connected, such as, for example, base station 504 over Uu connection 582.

A satellite 506 may provide global navigation satellite system (GNSS) timing synchronization, and/or frequency synchronization, to the out-of-coverage UE 520, and any other UEs that may not have the ability to receive LTE or 5G network timing synchronization and/or frequency synchronization.

In an exemplary embodiment, the UE 510 monitors the base station 502 for system information block (SIB) 10, SIB 11 and SIB 12 signals for alerts. An emergency alerts, such as a commercial mobile alert service (CMAS) communication, an earthquake tsunami warning system (ETWS) communication, or another alert message broadcast on a WAN communication network, such as an LTE or 5G communication network, may use a SIB 10, SIB 11 and/or a SIB 12 communication to convey the alert. In an exemplary embodiment, upon receipt of an alert, the UE 510 may convert the alert to a maximum transmission unit (MTU) protocol data unit (PDU) packet for transmission over a PC 5 interface to UEs that may not have received the SIB 10, SIB 11 or SIB 12 communication having the emergency alert. The MTU is the largest possible frame size of a communications protocol data unit (PDU) on a Layer 2 data network. In an exemplary embodiment, in this example, the UE 510 converts the received CMAS or ETWS alert to a PDU that will fit in an MTU frame for the PC 5 interface over which the alert is being transmitted. The communication from the UE 510 over the PC 5 interface to UEs that may not have received the SIB 10, SIB 11 or SIB 12 communication may be performed using the GNSS timing and frequency synchronization provided by the satellite 506, thus ensuring that the UEs that may not have received the SIB 10, SIB 11 or SIB 12 communication because they are not connected to the base station 502 or the base station 504, are all synchronized to the PC 5 interface using the GNSS timing synchronization and frequency synchronization. A UE being synchronized to the PC 5 interface using the GNSS timing and/or frequency synchronization may be part of a UEs pre-configuration, for example, as defined by SLX V2V section 36.331. For example, a Mode 4 UE and/or an out-of-coverage Mode 3 UE, which are not connected to a base station, may have preconfigured sidelink resource pools for receiving and transmitting data with other UEs. For example, the UE 510 may transmit the MTU PDU communication with the emergency alert to the UE 515 in either a non-IP or IPv6 communication over the PC 5 interface 542, and/or may transmit the MTU PDU communication with the emergency alert to the UE 520 in either a non-IP or IPv6 communication over PC 5 interface 544. In this manner, a UE, such as the UE 515 and the UE 520, which may not be capable of receiving an alert, may receive the alert communication from the UE 510. The UE 510 will continue forwarding the alert in this manner for a pre-determined, or a dynamically configurable, period of time, X, or for a pre-determined distance, Y, that the UE 510 may travel after receiving the alert. For example, the pre-determined or dynamic period of time, X, may be related to the nature of the alert, or other factors. The pre-determined distance, Y, may be related to how far the UE 510, in this example, travels after receiving the alert, such that the alert may become less significant as the UE 510 travels away from the location where the alert was received.

In another exemplary embodiment, the RSU 514 or the CV2X UE 525 monitors the network 516, for system information block (SIB) 10, SIB 11 and SIB 12 communications, which may indicate an emergency alert. In another exemplary embodiment, the RSU 514 or the CV2X UE 525 monitors the network 516, for an IP communication that may include an emergency alert. Upon receipt of an emergency alert, the RSU 514 or the CV2X UE 525 may convert the alert to a maximum transmission unit (MTU) protocol data unit (PDU) packet for transmission over a PC 5 interface to UEs that may not have received the SIB 10, SIB 11 or SIB 12 communication, similar to that described above for the UE 510. For example, the RSU 514 may transmit the MTU PDU communication to the UE 525 over connection 578, and/or the UE 525 may transmit the MTU PDU communication to the UE 515 over PC 5 interface 548 in either a non-IP or IPv6 communication. The destination address may be set to a group cast and the communication resources for this PC 5 communication may be allocated by a base station, such as the base station 502 or the base station 504. In this manner, a UE, such as the UE 525, may receive the alert communication from the RSU 514 or from the network 516. The UE 525 may continue forwarding the alert in this manner for a pre-determined, or dynamically configurable, period of time. In the case of an RSU, such as the RSU 514, it is assumed that an RSU is stationary, so associating a pre-determined distance to the PC 5 communication of the emergency alert messages from the RSU 514 to the UE 525 may be inapplicable.

In another exemplary embodiment, the UE 515 may be subscribed to receive alerts over a PC 5 interface, such as the PC 5 interface 542. Upon receipt of an alert from the UE 510 over the PC 5 interface 542, or from another UE, such as another Mode 4 UE, the UE 515 may pass the alert from its lower communication layers up to its higher (application) layer along with a timestamp and a GPS location. The UE 515 may determine whether the same alert was received within a recent time period, and if so, it may discard the alert. If the UE 515 determines that the alert is valid and not previously received, then the UE 515 begins forwarding the alert over PC 5 interfaces 542, 546 and 548 in either a non-IP or IPv6 communication to other Mode 4 UEs, RSUs or other out-of-coverage Mode 3 UEs for a pre-determined or dynamically configurable period of time and/or over a pre-determined distance.

In another exemplary embodiment, the V2X/RSU node 512 may be subscribed to receive alerts over one or more of the Uu interface 562, the communication channel 572, and the PC 5 interface 552. Upon receipt of an alert, the V2X/RSU node 512 may pass the alert from its lower communication layers up to its higher (application) layer along with a timestamp and a GPS location. The V2X/RSU node 512 may convert the alert to a maximum transmission unit (MTU) protocol data unit (PDU) packet for transmission over a PC 5 interface to UEs that may not have received the SIB 10, SIB 11 or SIB 12 communication using GNSS timing and frequency synchronization provided by the satellite 506, as described above. For example, the V2X/RSU node 512 may transmit the MTU PDU communication to the UE 525 over PC 5 interface 552 in either a non-IP or IPv6 communication. The destination address may be set to a group cast and the resources may be allocated by a base station. In this manner, a UE, such as the UE 525, may receive the alert communication from the V2X/RSU node 512.

Figure 6:
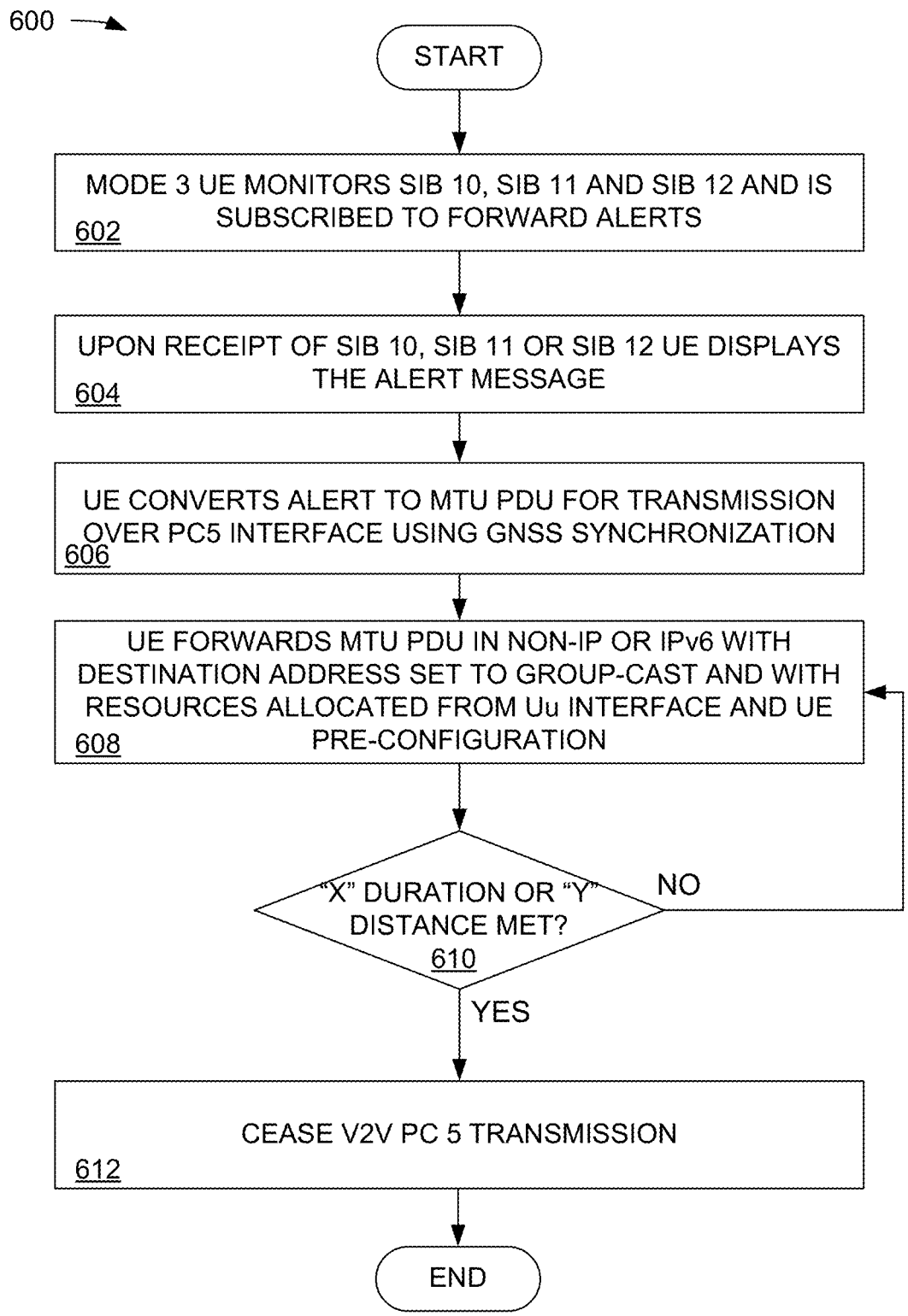
FIG. 6 is a flow chart illustrating an example of a method for communication, in accordance with various aspects of the present disclosure.

FIG. 6 is a flow chart illustrating an example of a method 600 for communication, in accordance with various aspects of the present disclosure. In the method 600, it is assumed that a subject UE may be a vehicle capable of vehicle-to-vehicle communication and one that is in connected to a WAN, such as an LTE or 5G network, in Mode 3.

In block 602, a Mode 3 UE monitors system information block (SIB) 10, SIB 11 and SIB 12 signals for alerts. Examples of alerts may include a CMAS communication, an ETWS communication, or another alert message. In an exemplary embodiment, the UE is subscribed at its application layer to forward these alerts. For example, a UE may have its upper communication layers, such as its application layer, configured or pre-configured to be subscribed to various applications and may have its transmit and receive properties configured accordingly. For example, in an exemplary embodiment, the UEs 510, 515, 520 and 525, the RSU 514, the V2X node 512 and the network 516 are all always subscribed to transmit and receive CMAS alerts, ETWS alerts, and other alerts.

In block 604, upon receipt of an alert, the UE may display the alert on its display, may initiate an audible warning, may initiate a haptic warning, such as a vibration, or may otherwise display the alert message.

In block 606, the UE may convert the alert to a maximum transmission unit (MTU) protocol data unit (PDU) packet for transmission over a PC 5 interface to UEs that may not have received the SIB 10, SIB 11 or SIB 12 communication, using GNSS timing and frequency synchronization.

In block 608, the UE may transmit the MTU PDU communication to another UE that may not have received the alert in either a non-IP or IPv6 communication over a PC 5 interface with an address set to group-cast and using resources allocated from the Uu interface and resources from the UEs pre-configuration. For example, the UE 510 may broadcast the alert over the PC 5 interface to UEs 515 and 520 as a multi-cast message and to all UEs that may be in the vicinity of the UE 510 and that may have a PC 5 interface connection established with the UE 510, not individually addressed to the UEs 515 and 520. In an exemplary embodiment, the resources used by the UE 510 to transmit the emergency alert message over the PC 5 interface may be allocated by the base station 502 over the Uu interface 532. In an exemplary embodiment, a UE, such as the UE 510 may also be at least partially pre-configured to transmit the emergency alert over the PC 5 interface and the UEs 515 and 520 may be at least partially pre-configured to receive (and in some embodiments, retransmit) the emergency alert over the PC 5 interface, without the resources being allocated by the base station 502. In this manner, a UE, such as the UE 515 and the UE 520, which may not be capable of receiving an alert, may receive the alert communication from the UE 510.

In block 610, it is determined whether a predefined duration of time "X" and/or a pre-determined distance "Y" has been met. If it is determined in block 610 that a predefined duration of time "X" and/or a pre-determined distance "Y" has not been met, the process returns to block 608 and the MTU PDU transmission continues. If it is determined in block 610 that a predefined duration of time "X" and/or a pre-determined distance "Y" has been met, the process proceeds to block 612.

In block 612, the V2V PC 5 transmission of the MTU PDU communication ceases.

Figure 7:
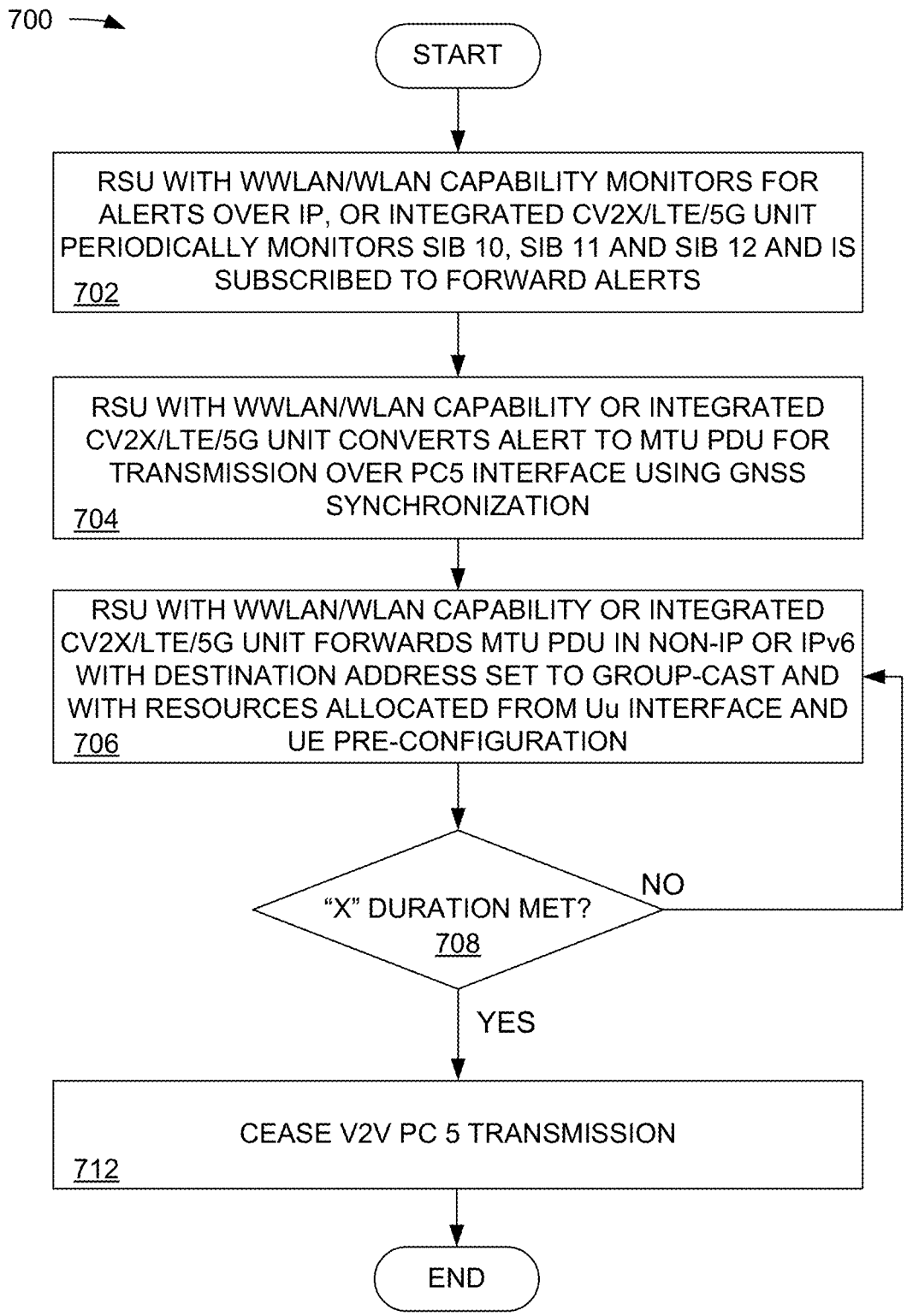
FIG. 7 is a flow chart illustrating an example of a method for communication, in accordance with various aspects of the present disclosure.

FIG. 7 is a flow chart illustrating an example of a method 700 for communication, in accordance with various aspects of the present disclosure. In the method 700, the subject UE may be a roadside unit (RSU) coupled to a WWAN or a WLAN, or the subject UE may be an integrated CV2X/LTE/5G device having a connection to an LTE/5G communication network.

In block 702, an RSU with WWAN/WLAN capability, such as the RSU 514, monitors an IP network for an alert; or a CV2X/LTE/5G device periodically monitors system information block (SIB) 10, SIB 11 and SIB 12 signals for alerts. Examples of alerts may include a CMAS communication, an ETWS communication, or another alert message. In an exemplary embodiment, the RSU or the UE is subscribed at its application layer to forward these alerts. For example, an RSU or a UE may have its upper communication layers, such as its application layer, configured or pre-configured to be subscribed to various applications, such as an alert application, and may have its transmit and receive properties configured accordingly. For example, in an exemplary embodiment, the UEs 510, 515, 520 and 525, the RSU 514, the V2X node 512 and the network 516 are all always subscribed to transmit and receive CMAS alerts, ETWS alerts, etc.

In block 704, the RSU or the CV2X/LTE/5G UE may convert the alert to a maximum transmission unit (MTU) protocol data unit (PDU packet for transmission over a PC 5 interface to UEs that may not have received the SIB 10, SIB 11 or SIB 12 communication using GNSS timing and frequency synchronization.

In block 706, the RSU or the CV2X/LTE/5G UE may transmit the MTU communication to another UE that may not have received the alert in either a non-IP or IPv6 communication over a PC 5 interface with an address set to group-cast and using resources allocated from the Uu interface and resources from the UEs pre-configuration. For example, the RSU 514 or the CV2X UE 525 may broadcast the alert over the PC 5 interface to UEs 515 and 520 as a multi-cast message to all UEs that may be in the vicinity of the RSU 514 or the UE 525 and that may have a PC 5 interface connection established with the RSU 514 or the UE 525, and not individually addressed to the UEs 515 and 520. In an exemplary embodiment, the resources used by the RSU 514 or the UE 525 to transmit the emergency alert message over a PC 5 interface may be allocated by the base station 502 or the base station 504. In the case of the UE 525, the UE 525 may have been previously connected to a base station over a Uu connection, and could have been previously configured with sidelink resources to allow transmission over a PC 5 interface. In the case of the RSU 514, as described herein, the RSU 514 may have had sidelink resources for V2X communications preconfigured, or in an exemplary embodiment where the RSU 514 is connected to a base station, such as base station 504 over optional Uu connection 582, (i.e., similar to V2X node 512), the sidelink resources could be configured by the base station to which the RSU 514 would be, or would have been, connected. In an exemplary embodiment, a UE, such as the UE 525 may also be at least partially pre-configured to transmit the emergency alert over the PC 5 interface, as described above. In this manner, a UE, such as the UE 515 and the UE 520, which may not be capable of receiving an alert, may receive the alert communication.

In block 708, it is determined whether a predefined duration of time "X" has been met. If it is determined in block 708 that a predefined duration of time "X" has not been met, the process returns to block 706 and the MTU PDU transmission continues. If it is determined in block 708 that a predefined duration of time "X" has been met, the process proceeds to block 712.

In block 712, the V2V PC 5 transmission of the MTU communication ceases.

Figure 8:
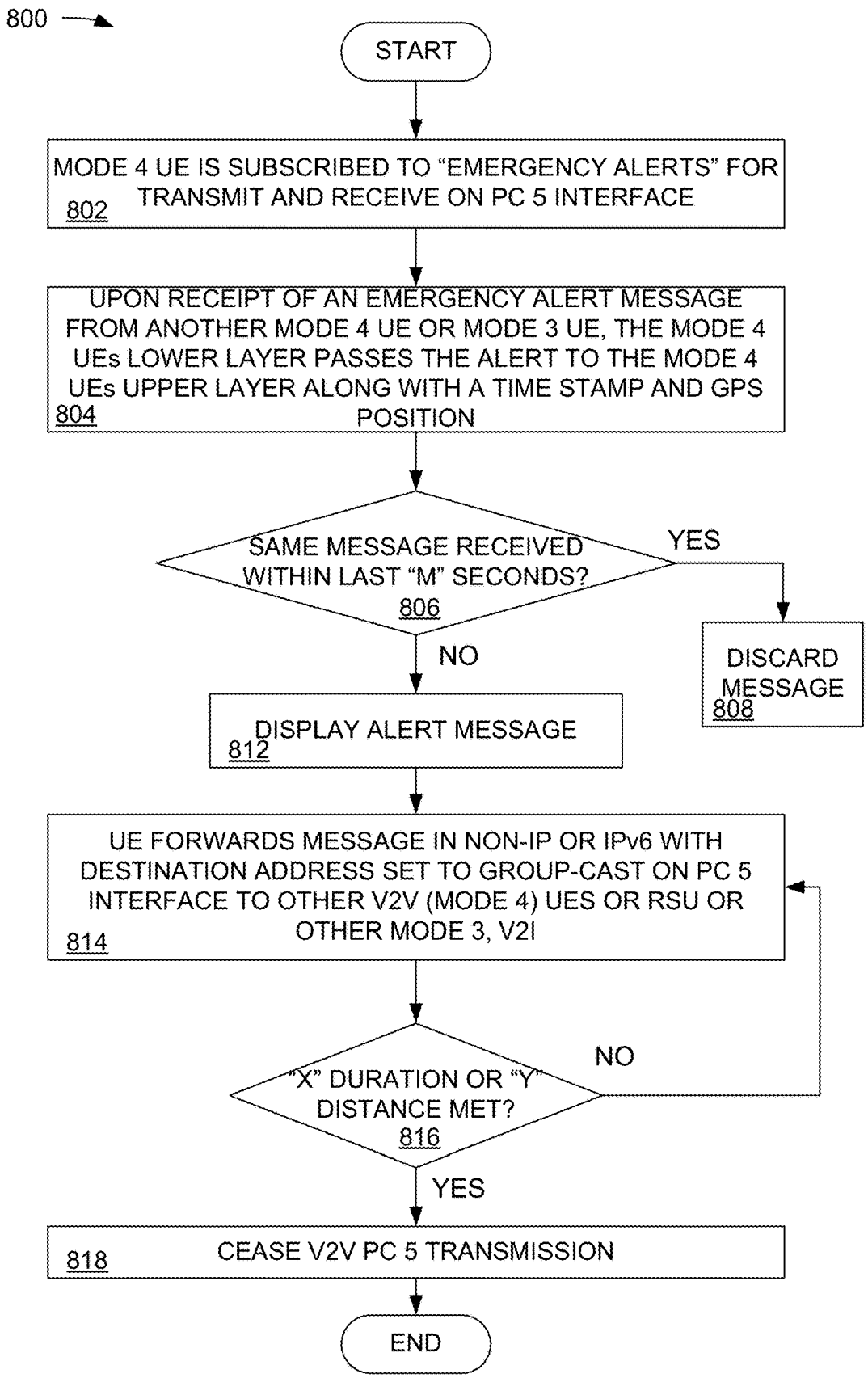
FIG. 8 is a flow chart illustrating an example of a method for communication, in accordance with various aspects of the present disclosure.

FIG. 8 is a flow chart illustrating an example of a method 800 for communication, in accordance with various aspects of the present disclosure. In the method 800, it is assumed that a subject UE may be a vehicle capable of vehicle-to-vehicle communication and one that is out of coverage of a WAN, in Mode 4.

In block 802, a Mode 4 UE is subscribed to emergency alerts and configured to transmit and receive over a PC 5 interface. For example, the UE 515 may be configured by its application layer to receive and transmit an emergency alert message over the PC 5 interface 542, 546 and/or 548.

In block 804, upon receipt of an emergency alert message (from another Mode 4 UE or from a Mode 3 UE), the Mode 4 UE lower layer (such as its physical layer) passes the alert to the UEs upper layer (such as its application layer) along with a time stamp and a GPS position. The time stamp and GPS position may be provided by, or obtained from, the satellite 506 (FIG. 5).

In an exemplary embodiment, because the Mode 4 UE receives and transmits the emergency alert over a PC 5 interface, in this exemplary embodiment, there is no conversion to an MTU PDU as described in FIG. 6 and FIG. 7.

In block 806, it is determined whether the alert received in block 804 is a duplicate alert message received within the last "M" seconds. The duration of "M" is configurable. If it is determined in block 806 that the alert received in block 804 is a duplicate alert message received within the last "M" seconds, then the message is discarded in block 808. If it is determined in block 806 that the alert received in block 804 is not a duplicate alert message received within the last "M" seconds, then, the message is displayed by the UE in block 812.

In block 814, the Mode 4 UE begins forwarding the alert over one or more PC 5 interfaces in either a non-IP or IPv6 communication to other Mode 4 UEs, RSUs or other out-of-coverage Mode 3 UEs for a pre-determined period of time and over a pre-determined distance.

In block 816, it is determined whether a predefined duration of time "X" and/or a pre-determined distance "Y" has been met. If it is determined in block 816 that a predefined duration of time "X" and/or a pre-determined distance "Y" has not been met, the process returns to block 814 and alert message transmission continues. If it is determined in block 816 that a predefined duration of time "X" and/or a pre-determined distance "Y" has been met, the process proceeds to block 818.

In block 818, the V2V PC 5 transmission ceases.

Figure 9:
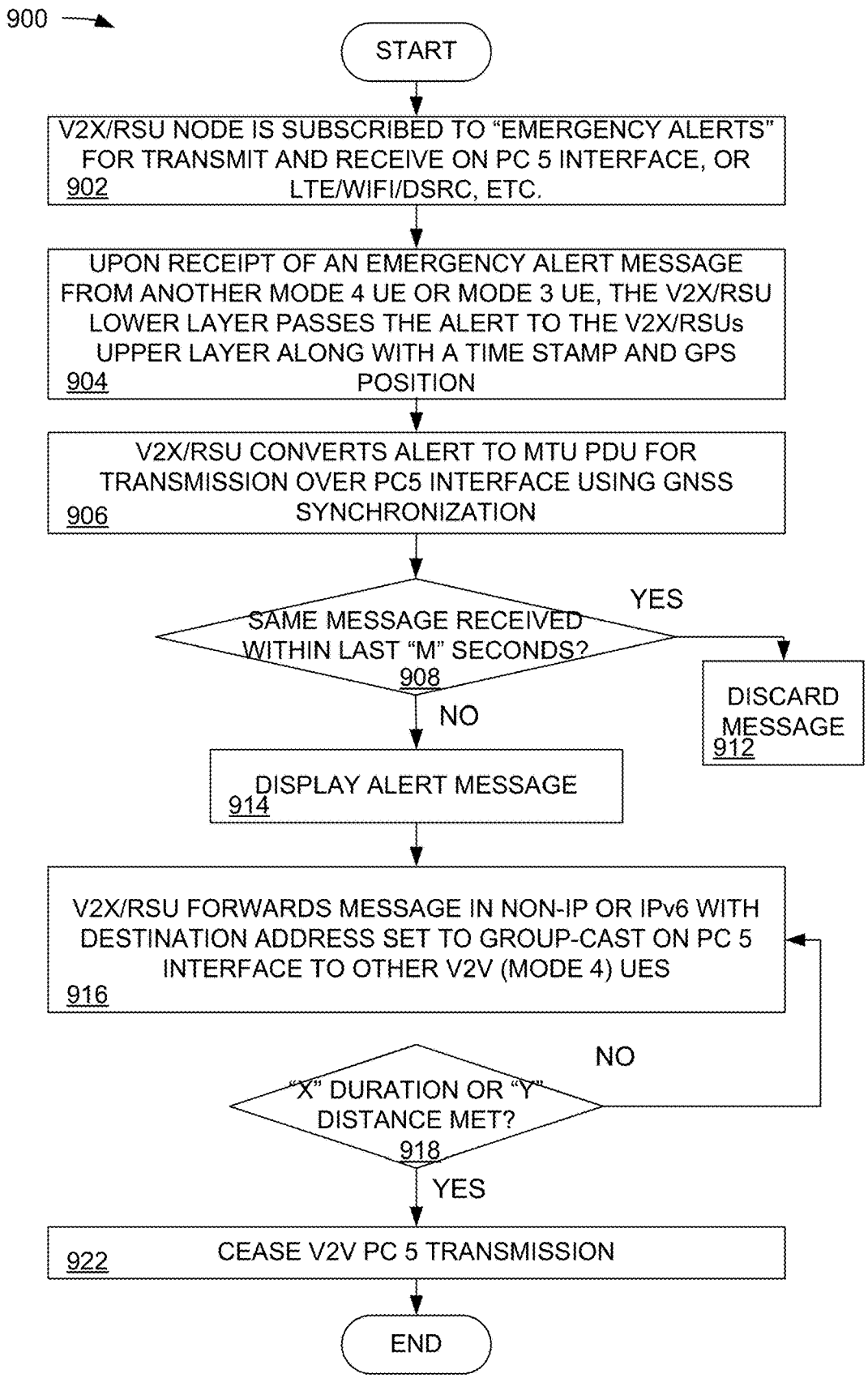
FIG. 9 is a flow chart illustrating an example of a method for communication, in accordance with various aspects of the present disclosure.

FIG. 9 is a flow chart illustrating an example of a method 900 for communication, in accordance with various aspects of the present disclosure. In the method 900, it is assumed that a subject UE may be a V2X node, an RSU, or another node.

In block 902, a V2X/RSU node is subscribed to emergency alerts and is configured to transmit and receive over a PC 5 interface. For example, the V2X node 512 may be configured by its application layer to receive and transmit an emergency alert message over the PC 5 interface 552.

In block 904, upon receipt of an emergency alert message (from another Mode 4 UE or from a Mode 3 UE), the V2X/RSU node's lower layer (such as its physical layer) passes the alert to the V2X/RSU node's upper layer (such as its application layer) along with a time stamp and a GPS position. The time stamp and GPS location may be provided by, or obtained from, the satellite 506 (FIG. 5)

In block 906, the V2X/RSU may convert the alert to a maximum transmission unit (MTU) protocol data unit (PDU) packet for transmission over a PC 5 interface to UEs that may not have received the SIB 10, SIB 11 or SIB 12 communication, using the GNSS timing and frequency synchronization.

In block 908, it is determined whether the alert received in block 904 is a duplicate alert message received within the last "M" seconds. If it is determined in block 908 that the alert received in block 904 is a duplicate alert message received within the last "M" seconds, then the message is discarded in block 912. If it is determined in block 908 that the alert received in block 904 is not a duplicate alert message received within the last "M" seconds, then, the message is displayed by the V2X/RSU in block 914.

In block 916, the V2X/RSU node begins forwarding the alert over one or more PC 5 interfaces in either a non-IP or IPv6 communication to other Mode 4 UEs, RSUs or other out-of-coverage Mode 3 UEs for a pre-determined period of time and/or over a pre-determined distance.

In block 918, it is determined whether a predefined duration of time "X" and/or a pre-determined distance "Y" has been met. If it is determined in block 918 that a predefined duration of time "X" and/or a pre-determined distance "Y" has not been met, the process returns to block 916 and alert message transmission continues. If it is determined in block 918 that a predefined duration of time "X" and/or a pre-determined distance "Y" has been met, the process proceeds to block 922.

In block 922, the V2V PC 5 transmission ceases.

Figure 10:
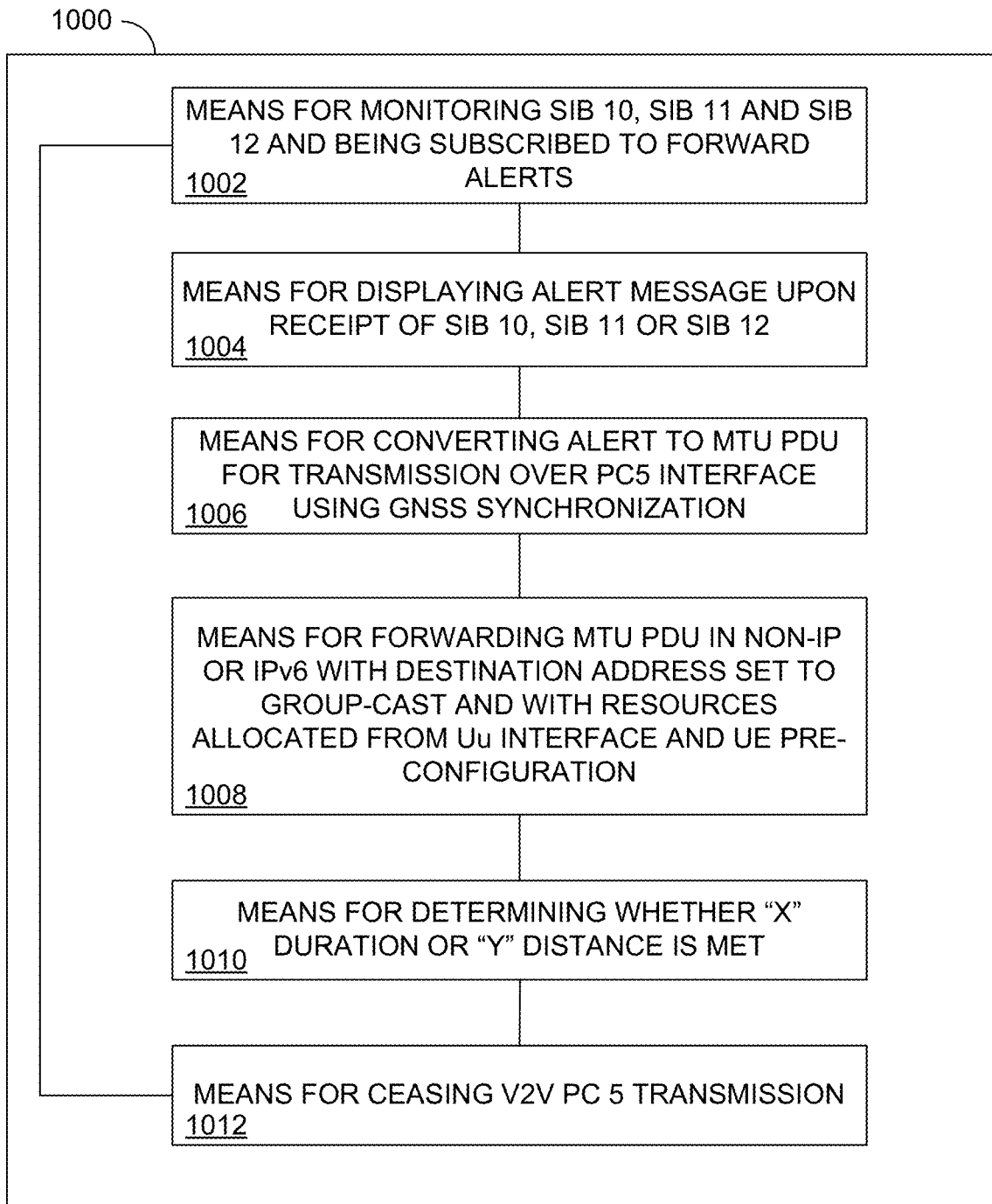
FIG. 10 is a functional block diagram of an apparatus for a communication system in accordance with various aspects of the present disclosure.

FIG. 10 is a functional block diagram of an apparatus 1000 for a communication system in accordance with various aspects of the present disclosure. The apparatus 1000 comprises means 1002 for monitoring SIB 10, SIB 11 and SIB 12 and being subscribed to forward alerts. In certain embodiments, the means 1002 for monitoring SIB 10, SIB 11 and SIB 12 and being subscribed to forward alerts can be configured to perform one or more of the function described in operation block 602 of method 600 (FIG. 6). In an exemplary embodiment, the means 1002 for monitoring SIB 10, SIB 11 and SIB 12 and being subscribed to forward alerts may comprise a UE monitoring SIB 10, SIB 11 and SIB 12 for alerts and having its application layer configured to forward the alerts over a PC 5 interface. For example, in an exemplary embodiment, the UEs 510, 515, 520 and 525, the RSU 514, the V2X node 512 and the network 516 are all always subscribed to transmit and receive CMAS alerts, ETWS alerts, and other alerts.

The apparatus 1000 further comprises means 1004 for displaying an alert upon receipt of a SIB 10, SIB 11 or SIB 12 communication. In certain embodiments, the means 1004 for displaying an alert upon receipt of a SIB 10, SIB 11 or SIB 12 communication can be configured to perform one or more of the function described in operation block 604 of method 600 (FIG. 6). In an exemplary embodiment, the means 1004 for displaying an alert upon receipt of a SIB 10, SIB 11 or SIB 12 communication may comprise a UE displaying the alert on its display, the UE initiating an audible warning, the UE initiating a haptic warning, such as a vibration, or the UE otherwise displaying the alert message.

The apparatus 1000 further comprises means 1006 for converting the alert to an MTU PDU for transmission over a PC 5 interface using GNSS synchronization. In certain embodiments, the means 1006 for converting the alert to an MTU PDU for transmission over a PC 5 interface using GNSS synchronization can be configured to perform one or more of the function described in operation block 606 of method 600 (FIG. 6). In an exemplary embodiment, the means 1006 for converting the alert to an MTU PDU for transmission over a PC 5 interface using GNSS synchronization may comprise a UE converting the alert to a maximum transmission unit (MTU) protocol data unit (PDU) packet for transmission over a PC 5 interface to UEs that may not have received the SIB 10, SIB 11 or SIB 12 communication, using GNSS timing and frequency synchronization.

The apparatus 1000 further comprises means 1008 for forwarding the MTU PDU communication to another UE that may not have received the alert in either a non-IP or IPv6 communication over a PC 5 interface with an address set to group-cast and using resources allocated from the Uu interface and resources from the UEs pre-configuration. In certain embodiments, the means 1008 for forwarding the MTU PDU communication to another UE that may not have received the alert in either a non-IP or IPv6 communication over a PC 5 interface with an address set to group-cast and using resources allocated from the Uu interface and resources from the UEs pre-configuration can be configured to perform one or more of the function described in operation block 608 of method 600 (FIG. 6). In an exemplary embodiment, the means 1008 for forwarding the MTU PDU communication to another UE that may not have received the alert in either a non-IP or IPv6 communication over a PC 5 interface with an address set to group-cast and using resources allocated from the Uu interface and resources from the UEs pre-configuration may comprise the UE 510 broadcasting the alert over the PC 5 interface to UEs 515 and 520 as a multi-cast message to all UEs that may be in the vicinity of the UE 510 and that may have a PC 5 interface connection established with the UE 510, not individually addressed to the UEs 515 and 520. In an exemplary embodiment, the resources used by the IE 520 to transmit the emergency alert message over the PC 5 interface may be allocated by the base station 502 over the Uu interface 532. In an exemplary embodiment, a UE, such as the UE 510 may also be at least partially pre-configured to transmit the emergency alert over the PC 5 interface.

The apparatus 1000 further comprises means 1010 for determining whether a predefined duration of time "X" and/or a pre-determined distance "Y" has been met. In certain embodiments, the means 1010 for determining whether a predefined duration of time "X" and/or a pre-determined distance "Y" has been met can be configured to perform one or more of the function described in operation block 610 of method 600 (FIG. 6). In an exemplary embodiment, the means 1010 for determining whether a predefined duration of time "X" and/or a pre-determined distance "Y" has been met may comprise a UE determining whether a predefined duration of time "X" and/or a pre-determined distance "Y" has been met to determine whether to maintain broadcasting the emergency alert over the PC 5 interface.

The apparatus 1000 further comprises means 1012 for ceasing V2V PC 5 transmission. In certain embodiments, the means 1012 for ceasing V2V PC 5 transmission can be configured to perform one or more of the function described in operation block 612 of method 600 (FIG. 6). In an exemplary embodiment, the means 1012 for ceasing V2V PC 5 transmission may comprise a UE determining that transmission of the emergency alert over the PC 5 interface should be terminated.

Figure 11:
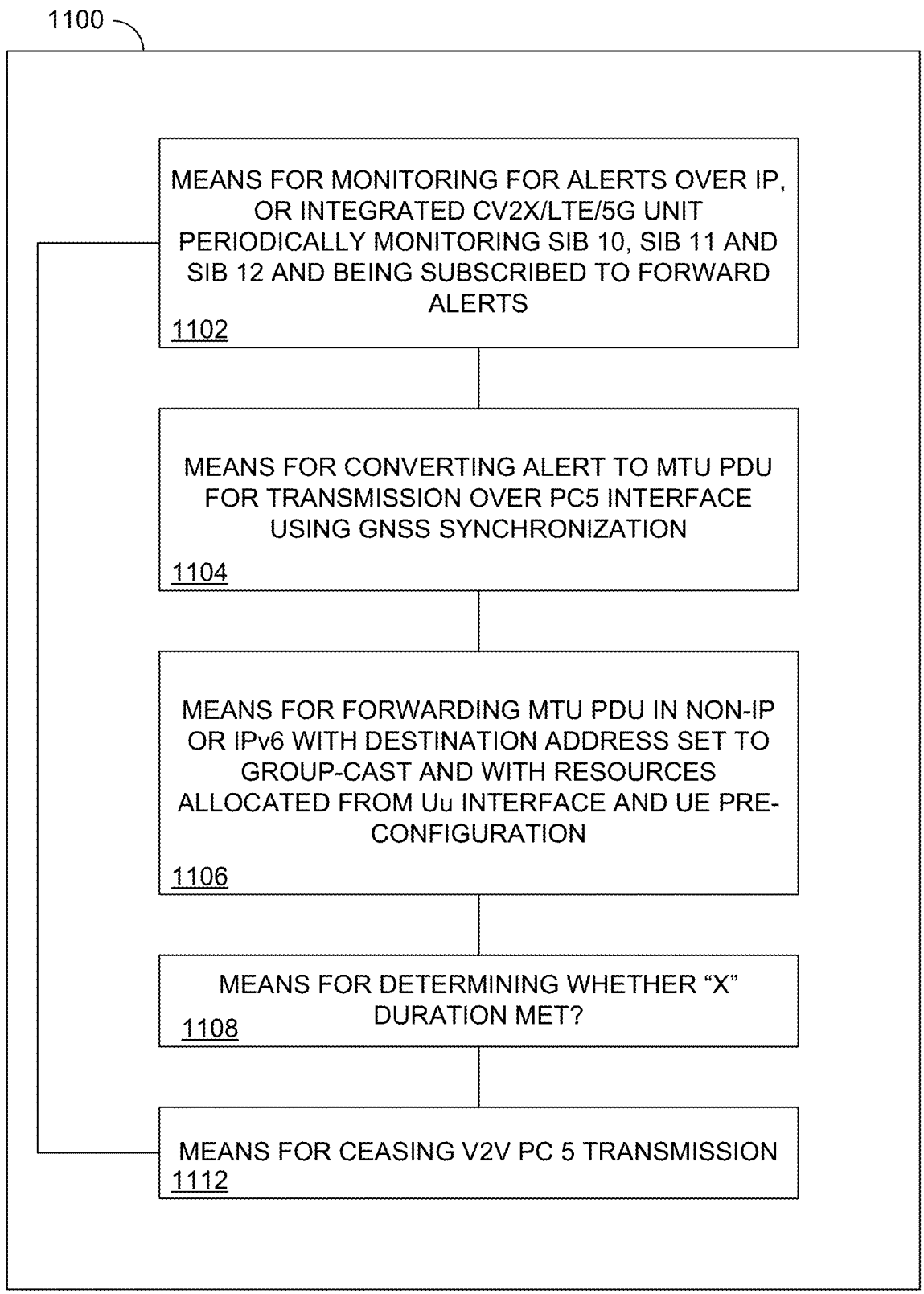
FIG. 11 is a functional block diagram of an apparatus for a communication system in accordance with various aspects of the present disclosure.

FIG. 11 is a functional block diagram of an apparatus 1100 for a communication system in accordance with various aspects of the present disclosure. The apparatus 1100 comprises means 1102 for an RSU monitoring an IP network for an alert; or a CV2X/LTE/5G device periodically monitoring system information block (SIB) 10, SIB 11 and SIB 12 signals for alerts. In certain embodiments, the means 1102 for an RSU monitoring an IP network for an alert; or a CV2X/LTE/5G device periodically monitoring system information block (SIB) 10, SIB 11 and SIB 12 signals for alerts can be configured to perform one or more of the function described in operation block 702 of method 700 (FIG. 7). In an exemplary embodiment, the means 1102 for an RSU monitoring an IP network for an alert; or a CV2X/LTE/5G device periodically monitoring system information block (SIB) 10, SIB 11 and SIB 12 signals for alerts may comprise monitoring for a CMAS communication or an ETWS communication and the RSU or the UE being subscribed at its application layer to forward these alerts. For example, an RSU or a UE may have its upper communication layers, such as its application layer, configured or pre-configured to be subscribed to various applications and may have its transmit and receive properties configured accordingly. For example, in an exemplary embodiment, the UEs 510, 515, 520 and 525, the RSU 514, the V2X node 512 and the network 516 are all always subscribed to transmit and receive CMAS alerts, ETWS alerts, and other alerts.

The apparatus 1100 further comprises means 1104 for converting the alert to an MTU PDU for transmission over a PC 5 interface using GNSS synchronization. In certain embodiments, the means 1104 for converting the alert to an MTU PDU for transmission over a PC 5 interface using GNSS synchronization can be configured to perform one or more of the function described in operation block 7040 of method 700 (FIG. 7). In an exemplary embodiment, the means 1104 for converting the alert to an MTU PDU for transmission over a PC 5 interface using GNSS synchronization may comprise an RSU or a UE converting the alert to a maximum transmission unit (MTU) protocol data unit (PDU) packet for transmission over a PC 5 interface to UEs that may not have received the SIB 10, SIB 11 or SIB 12 communication, using GNSS synchronization.

The apparatus 1100 further comprises means 1106 for forwarding the MTU PDU communication to another UE that may not have received the alert in either a non-IP or IPv6 communication over a PC 5 interface with an address set to group-cast and using resources allocated from the Uu interface and resources from the UEs pre-configuration. In certain embodiments, the means 1106 for forwarding the MTU PDU communication to another UE that may not have received the alert in either a non-IP or IPv6 communication over a PC 5 interface with an address set to group-cast and using resources allocated from the Uu interface and resources from the UEs pre-configuration can be configured to perform one or more of the function described in operation block 706 of method 700 (FIG. 7). In an exemplary embodiment, the means 1106 for forwarding the MTU PDU communication to another UE that may not have received the alert in either a non-IP or IPv6 communication over a PC 5 interface with an address set to group-cast and using resources allocated from the Uu interface and resources from the UEs pre-configuration may comprise the RSU 514 or the UE 525 broadcasting the alert over the PC 5 interface to UEs 515 and 520 as a multi-cast message to all UEs that may be in the vicinity of the UE 525 or the RSU 514 and that may have a PC 5 interface connection established with the UE 525, not individually addressed to the UEs 515 and 520. In an exemplary embodiment, the resources used by the UE 525 to transmit the emergency alert message over the PC 5 interface may be allocated by the base station 502 over the Uu interface 532. In an exemplary embodiment, a UE, such as the UE 510 may also be at least partially pre-configured to transmit the emergency alert over the PC 5 interface.

The apparatus 1100 further comprises means 1108 for determining whether a predefined duration of time "X" has been met. In certain embodiments, the means 1108 for determining whether a predefined duration of time "X" has been met can be configured to perform one or more of the function described in operation block 708 of method 700 (FIG. 7). In an exemplary embodiment, the means 1108 for determining whether a predefined duration of time "X" has been met may comprise a UE determining whether a predefined duration of time "X" has been met to determine whether to maintain broadcasting the emergency alert over the PC 5 interface.

The apparatus 1100 further comprises means 1112 for ceasing V2V PC 5 transmission. In certain embodiments, the means 1112 for ceasing V2V PC 5 transmission can be configured to perform one or more of the function described in operation block 712 of method 700 (FIG. 7). In an exemplary embodiment, the means 1112 for ceasing V2V PC 5 transmission may comprise a UE determining that transmission of the emergency alert over the PC 5 interface should be terminated.

Figure 12:
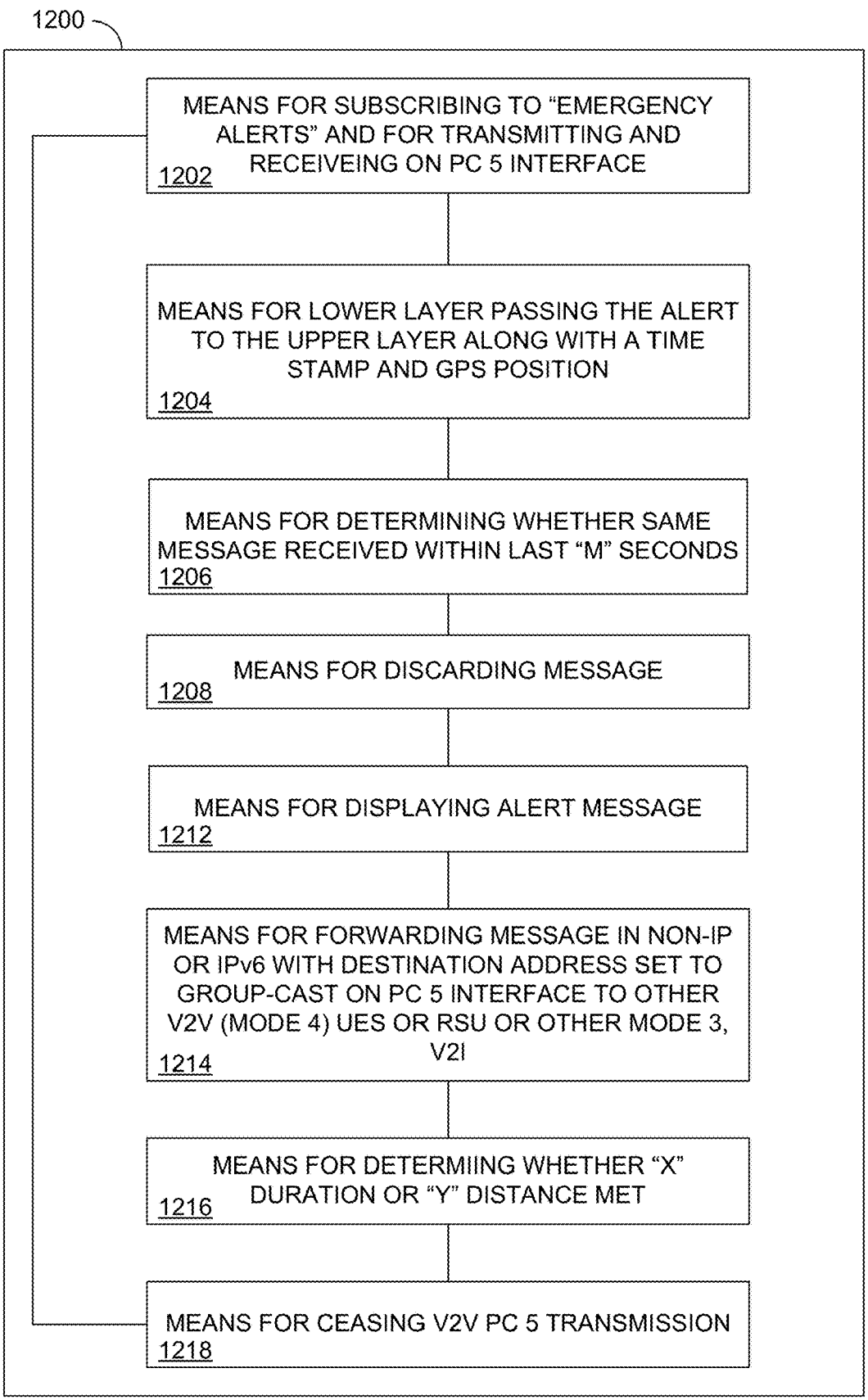
FIG. 12 is a functional block diagram of an apparatus a communication system in accordance with various aspects of the present disclosure.

FIG. 12 is a functional block diagram of an apparatus 1200 for a communication system in accordance with various aspects of the present disclosure. The apparatus 1200 comprises means 1202 for subscribing to emergency alerts and transmitting and receiving over a PC 5 interface. In certain embodiments, the means 1202 for subscribing to emergency alerts and transmitting and receiving over a PC 5 interface can be configured to perform one or more of the function described in operation block 802 of method 800 (FIG. 8). In an exemplary embodiment, the means 1202 for subscribing to emergency alerts and transmitting and receiving over a PC 5 interface may comprise the UE 515 being configured by its application layer to receive and transmit an emergency alert message over the PC 5 interface 542, 546 and/or 548.

The apparatus 1200 further comprises means 1204 for a device's lower layer passing the alert to the device's upper layer along with a time stamp and a GPS position. In certain embodiments, the means 1204 for a device's lower layer passing the alert to the device's upper layer along with a time stamp and a GPS position can be configured to perform one or more of the function described in operation block 804 of method 800 (FIG. 8). In an exemplary embodiment, the means 1204 for a device's lower layer passing the alert to the device's upper layer along with a time stamp and a GPS position may comprise a Mode 4 UE's lower layer (such as its physical layer) passing the alert to the UE's upper layer (such as its application layer) along with a time stamp and a GPS position. The time stamp and GPS location may be provided by, or obtained from, the satellite 506 (FIG. 5).

The apparatus 1200 further comprises means 1206 for determining whether the received alert is a duplicate alert message received within the last "M" seconds. In certain embodiments, the means 1206 for determining whether the received alert is a duplicate alert message received within the last "M" seconds can be configured to perform one or more of the function described in operation block 806 of method 800 (FIG. 8). In an exemplary embodiment, the means 1206 for determining whether the received alert is a duplicate alert message received within the last "M" seconds may comprise the UE 450 determining whether the alert was a duplicate received in the last "M" seconds.

The apparatus 1200 further comprises means 1208 for discarding the message if the alert was a duplicate received within the last "M" seconds. In certain embodiments, the means 1208 for discarding the message if the alert was a duplicate received within the last "M" seconds can be configured to perform one or more of the function described in operation block 808 of method 800 (FIG. 8). In an exemplary embodiment, the means 1208 for discarding the message if the alert was a duplicate received within the last "M" seconds may comprise the UE 450 discarding the message.

The apparatus 1200 further comprises means 1212 for displaying the alert. In certain embodiments, the means 1212 for displaying the alert can be configured to perform one or more of the function described in operation block 812 of method 800 (FIG. 8). In an exemplary embodiment, the means 1212 for displaying the alert may comprise a UE displaying the alert on its display, the UE initiating an audible warning, the UE initiating a haptic warning, such as a vibration, or the UE otherwise displaying the alert message.

The apparatus 1200 further comprises means 1214 for forwarding the MTU communication to another UE that may not have received the alert in either a non-IP or IPv6 communication over a PC 5 interface with an address set to group-cast. In certain embodiments, the means 1214 for forwarding the MTU communication to another UE that may not have received the alert in either a non-IP or IPv6 communication over a PC 5 interface with an address set to group-cast can be configured to perform one or more of the function described in operation block 814 of method 800 (FIG. 8). In an exemplary embodiment, the means 1214 for forwarding the MTU communication to another UE that may not have received the alert in either a non-IP or IPv6 communication over a PC 5 interface with an address set to group-cast may comprise the Mode 4 UE forwarding the alert over one or more PC 5 interfaces in either a non-IP or IPv6 communication to other Mode 4 UEs, RSUs or other out-of-coverage Mode 3 UEs for a pre-determined period of time and over a pre-determined distance.

The apparatus 1200 further comprises means 1216 for determining whether a predefined duration of time "X" and/or a pre-determined distance "Y" has been met. In certain embodiments, the means 1216 for determining whether a predefined duration of time "X" and/or a pre-determined distance "Y" has been met can be configured to perform one or more of the function described in operation block 816 of method 800 (FIG. 8). In an exemplary embodiment, the means 1216 for determining whether a predefined duration of time "X" and/or a pre-determined distance "Y" has been met may comprise a UE determining whether a predefined duration of time "X" and/or a pre-determined distance "Y" has been met to determine whether to maintain broadcasting the emergency alert over the PC 5 interface.

The apparatus 1200 further comprises means 1218 for ceasing V2V PC 5 transmission. In certain embodiments, the means 1218 for ceasing V2V PC 5 transmission can be configured to perform one or more of the function described in operation block 818 of method 800 (FIG. 8). In an exemplary embodiment, the means 1218 for ceasing V2V PC 5 transmission may comprise a UE determining that transmission of the emergency alert over the PC 5 interface should be terminated.

Figure 13:
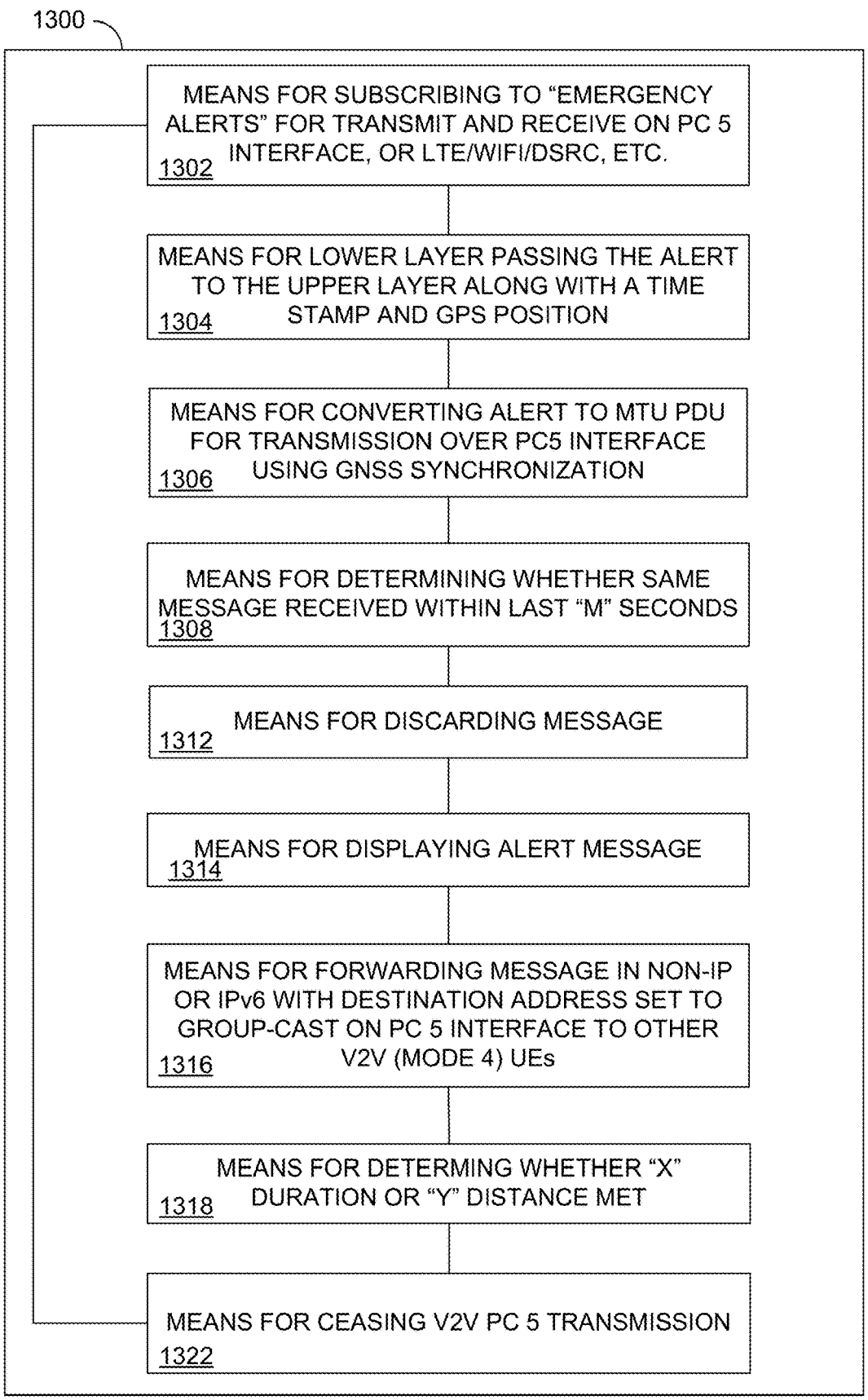
FIG. 13 is a functional block diagram of an apparatus for a communication system in accordance with various aspects of the present disclosure.

FIG. 13 is a functional block diagram of an apparatus 1300 for a communication system in accordance with various aspects of the present disclosure. The apparatus 1300 comprises means 1302 for subscribing to emergency alerts and transmitting and receiving over a PC 5 interface. In certain embodiments, the means 1302 for subscribing to emergency alerts and transmitting and receiving over a PC 5 interface can be configured to perform one or more of the function described in operation block 902 of method 900 (FIG. 9). In an exemplary embodiment, the means 1302 for subscribing to emergency alerts and transmitting and receiving over a PC 5 interface may comprise the V2X node 512 being configured by its application layer to receive and transmit an emergency alert message over the PC 5 interface 552.

The apparatus 1300 further comprises means 1304 for a device's lower layer passing the alert to the device's upper layer along with a time stamp and a GPS position. In certain embodiments, the means 1304 for a device's lower layer passing the alert to the device's upper layer along with a time stamp and a GPS position can be configured to perform one or more of the function described in operation block 904 of method 900 (FIG. 9). In an exemplary embodiment, the means 1304 for a device's lower layer passing the alert to the device's upper layer along with a time stamp and a GPS position may comprise the V2X/RSU node's lower layer (such as its physical layer) passing the alert to the V2X/RSU node's upper layer (such as its application layer) along with a time stamp and a GPS position.

The apparatus 1300 further comprises means 1306 for converting the alert to an MTU PDU for transmission over a PC 5 interface using GNSS synchronization. In certain embodiments, the means 1306 for converting the alert to an MTU PDU for transmission over a PC 5 interface using GNSS synchronization can be configured to perform one or more of the function described in operation block 906 of method 900 (FIG. 9). In an exemplary embodiment, the means 1306 for converting the alert to an MTU PDU for transmission over a PC 5 interface using GNSS synchronization may comprise the V2X/RSU converting the alert to a maximum transmission unit (MTU) protocol data unit (PDU) packet for transmission over a PC 5 interface to UEs that may not have received the SIB 10, SIB 11 or SIB 12 communication, using the GNSS synchronization.

The apparatus 1300 further comprises means 1308 for determining whether the received alert is a duplicate alert message received within the last "M" seconds. In certain embodiments, the means 1308 for determining whether the received alert is a duplicate alert message received within the last "M" seconds can be configured to perform one or more of the function described in operation block 908 of method 900 (FIG. 9). In an exemplary embodiment, the means 1308 for determining whether the received alert is a duplicate alert message received within the last "M" seconds may comprise the V2X/RSU determining whether the alert was a duplicate received in the last "M" seconds.

The apparatus 1300 further comprises means 1312 for discarding the message if the alert was a duplicate received within the last "M" seconds. In certain embodiments, the means 1312 for discarding the message if the alert was a duplicate received within the last "M" seconds can be configured to perform one or more of the function described in operation block 912 of method 900 (FIG. 9). In an exemplary embodiment, the means 1312 for discarding the message if the alert was a duplicate received within the last "M" seconds may comprise the V2X/RSU node 512 discarding the message.

The apparatus 1300 further comprises means 1314 for displaying the alert. In certain embodiments, the means 1314 for displaying the alert can be configured to perform one or more of the function described in operation block 914 of method 900 (FIG. 9). In an exemplary embodiment, the means 1314 for displaying the alert may comprise a V2X/RSU node 512 displaying the alert on its display, the V2X/RSU node 512 initiating an audible warning, the V2X/RSU node 512 initiating a haptic warning, such as a vibration, or the UE otherwise displaying the alert message.

The apparatus 1300 further comprises means 1316 for forwarding the MTU PDU communication to another UE that may not have received the alert in either a non-IP or IPv6 communication over a PC 5 interface with an address set to group-cast. In certain embodiments, the means 1316 for forwarding the MTU PDU communication to another UE that may not have received the alert in either a non-IP or IPv6 communication over a PC 5 interface with an address set to group-cast can be configured to perform one or more of the function described in operation block 916 of method 900 (FIG. 9). In an exemplary embodiment, the means 1316 for forwarding the MTU PDU communication to another UE that may not have received the alert in either a non-IP or IPv6 communication over a PC 5 interface with an address set to group-cast may comprise the V2X/RSU node 512 forwarding the alert over one or more PC 5 interfaces in either a non-IP or IPv6 communication to other Mode 4 UEs, RSUs or other out-of-coverage Mode 3 UEs for a pre-determined period of time and over a pre-determined distance.

The apparatus 1300 further comprises means 1318 for determining whether a predefined duration of time "X" and/or a pre-determined distance "Y" has been met. In certain embodiments, the means 1318 for determining whether a predefined duration of time "X" and/or a pre-determined distance "Y" has been met can be configured to perform one or more of the function described in operation block 918 of method 900 (FIG. 9). In an exemplary embodiment, the means 1318 for determining whether a predefined duration of time "X" and/or a pre-determined distance "Y" has been met may comprise a V2X/RSU node 512 determining whether a predefined duration of time "X" and/or a pre-determined distance "Y" has been met to determine whether to maintain broadcasting the emergency alert over the PC 5 interface.

The apparatus 1300 further comprises means 1322 for ceasing V2V PC 5 transmission. In certain embodiments, the means 1322 for ceasing V2V PC 5 transmission can be configured to perform one or more of the function described in operation block 922 of method 900 (FIG. 9). In an exemplary embodiment, the means 1322 for ceasing V2V PC 5 transmission may comprise a V2X/RSU node 512 determining that transmission of the emergency alert over the PC 5 interface should be terminated.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for forwarding an emergency alert message, comprising:
   receiving an emergency alert message in a first message format in a first communication device over a first communication network;
   converting the emergency alert message from the first message format to a second message format; and
   during a predefined duration of time, continually forwarding the emergency alert message in the second message format to a second communication device in a second communication network, the second communication network comprising a vehicle-to-vehicle communication network, the second communication device incapable of receiving the emergency alert message over the first communication network.

2. The method of claim 1, wherein the first communication network is selected from the group consisting of a WiFi network, a dedicated short range communication (DSRC) network, and an integrated cellular vehicle to everything (CV2X)/LTE/5G network.

3. The method of claim 1, further comprising:
receiving the emergency alert message by the first communication device in the first message format, the emergency alert message comprising one of a CMAS communication and an ETWS communication in at least one of a SIB 10, 11, and 12 communication; and
forwarding the emergency alert message to the second communication device in the second message format, the second message format comprising a PC 5 communication.

4. The method of claim 1, further comprising:
receiving the emergency alert message by the first communication device in the first message format, the emergency alert message comprising one of a CMAS communication and an ETWS communication in an IP communication; and
forwarding the emergency alert message to the second communication device in the second message format, the second message format comprising a PC 5 communication.

5. The method of claim 1, wherein the second communication device is an out-of-coverage Mode 3 user equipment (UE).

6. The method of claim 1, further comprising using a global navigation satellite system (GNSS) timing synchronization, and/or frequency synchronization, to provide network timing synchronization and/or frequency synchronization to the second communication device.

7. The method of claim 1, wherein continually forwarding the emergency alert message further comprises continually wirelessly forwarding the emergency alert message.

8. The method of claim 1, wherein continually forwarding the emergency alert message in the second message format to a second communication device in a second communication network comprises using preconfigured sidelink resources.

9. A system for communication, comprising:
a first communication device configured to receive an emergency alert message in a first message format over a first communication network;
the first communication device configured to convert the emergency alert message from the first message format to a second message format; and
the first communication device configured to continually forward, during a predefined duration of time, the emergency alert message in the second message format to a second communication device in a second communication network, the second communication network comprising a vehicle-to-vehicle communication network, the second communication device incapable of receiving the emergency alert message over the first communication network.

10. The system of claim 9, wherein the first communication network is selected from the group consisting of a WiFi network, a dedicated short range communication (DSRC) network, and an integrated cellular vehicle to everything (CV2X)/LTE/5G network.

11. The system of claim 9, further comprising:
the first communication device configured to receive the emergency alert message in the first message format comprising one of a CMAS communication and an ETWS communication in at least one of a SIB 10, 11, and 12 communication; and
the first communication device configured to forward the emergency alert message to the second communication device in the second message format, the second message format comprising a PC 5 communication.

12. The system of claim 9, further comprising:
the first communication device configured to receive the emergency alert message in the first message format comprising one of a CMAS communication and an ETWS communication in an IP communication; and
the first communication device configured to forward the emergency alert message to the second communication device in the second message format, the second format comprising a PC 5 communication.

13. The system of claim 9, wherein the second communication device is an out-of-coverage Mode 3 user equipment (UE).

14. The system of claim 9, further comprising a global navigation satellite system (GNSS) timing synchronization, and/or frequency synchronization configured to provide network timing synchronization and/or frequency synchronization to the second communication device.

15. The system of claim 9, wherein continually forwarding the emergency alert message further comprises continually wirelessly forwarding the emergency alert message.

16. The system of claim 9, wherein continually forwarding the emergency alert message in the second message format to a second communication device in a second communication network comprises using preconfigured sidelink resources.

17. A non-transitory computer-readable medium storing computer executable code for communication, the code executable by a processor to control a method comprising:
receiving an emergency alert message in a first message format in a first communication device over a first communication network;
converting the emergency alert message from the first message format to a second message format; and
during a predefined duration of time, continually forwarding the emergency alert message in the second message format to a second communication device in a second communication network, the second communication network comprising a vehicle-to-vehicle communication network, the second communication device incapable of receiving the emergency alert message over the first communication network.

18. The non-transitory computer-readable medium of claim 17, wherein the first communication network is selected from the group consisting of a WiFi network, a dedicated short range communication (DSRC) network, and an integrated cellular vehicle to everything (CV2X)/LTE/5G network.

19. The non-transitory computer-readable medium of claim 17, wherein the code is executable by a processor to control the method further comprising:
receiving the emergency alert message by the first communication device in the first message format, the emergency alert message comprising one of a CMAS communication and an ETWS communication in at least one of a SIB 10, 11, and 12 communication; and
forwarding the emergency alert message to the second communication device in the second message format, the second message format comprising a PC 5 communication.

20. The non-transitory computer-readable medium of claim 17, wherein the code is executable by a processor to control the method further comprising:
receiving the emergency alert message by the first communication device in the first message format, the emergency alert message comprising one of a CMAS communication and an ETWS communication in an IP communication; and forwarding the emergency alert message to the second communication device in the second message format, the second format comprising a PC 5 communication.

21. The non-transitory computer-readable medium of claim 17, wherein the code is executable by a processor to control the method further comprising using a global navigation satellite system (GNSS) timing synchronization, and/or frequency synchronization, to provide network timing synchronization and/or frequency synchronization to the second communication device.

22. The non-transitory computer-readable medium of claim 17, wherein continually forwarding the emergency alert message further comprises continually wirelessly forwarding the emergency alert message.

23. The non-transitory computer-readable medium of claim 17, wherein continually forwarding the emergency alert message in the second message format to a second communication device in a second communication network comprises using preconfigured sidelink resources.

24. A device for wireless communication, comprising:
means for receiving an emergency alert message in a first message format in a first communication device over a first communication network;
means for converting the emergency alert message to a second message format; and
means for continually forwarding the emergency alert message, during a predefined duration of time, in the second message format to a second communication device in a second communication network, the second communication network comprising a vehicle-to-vehicle communication network, the second communication device incapable of receiving the emergency alert message over the first communication network.

25. The device of claim 24, wherein the first communication network is selected from the group consisting of a WiFi network, a dedicated short range communication (DSRC) network, and an integrated cellular vehicle to everything (CV2X)/LTE/5G network.

26. The device of claim 24, further comprising:
means for receiving the emergency alert message by the first communication device in the first message format, the emergency alert message comprising one of a CMAS communication and an ETWS communication in at least one of a SIB 10, 11, and 12 communication; and
means for forwarding the emergency alert message to the second communication device in the second message format, the second format comprising a PC 5 communication.

27. The device of claim 24, further comprising:
means for receiving the emergency alert message by the first communication device in the first message format, the emergency alert message comprising one of a CMAS communication and an ETWS communication in an IP communication; and
means for forwarding the emergency alert message to the second communication device in the second message format, the second format comprising a PC 5 communication.

28. The device of claim 24, further comprising means for using a global navigation satellite system (GNSS) timing synchronization, and/or frequency synchronization, to provide network timing synchronization and/or frequency synchronization to the second communication device.

29. The device of claim 24, wherein the means for continually forwarding the emergency alert message further comprises means for continually wirelessly forwarding the emergency alert message.

30. The device of claim 24, wherein the means for continually forwarding the emergency alert message in the second message format to a second communication device in a second communication network comprises means for using preconfigured sidelink resources.

\* \* \* \* \*